United States Patent
Takayanagi et al.

(10) Patent No.: US 10,162,387 B2
(45) Date of Patent: Dec. 25, 2018

(54) ROLLABLE DISPLAY DEVICE

(71) Applicant: Samsung Electronics Co., Ltd., Suwon-si, Gyeonggi-do (KR)

(72) Inventors: Toshikazu Takayanagi, Suwon-si (KR); Chang-bong Shin, Suwon-si (KR); Jin-ho Kim, Hanam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/669,335

(22) Filed: Aug. 4, 2017

(65) Prior Publication Data
US 2017/0329369 A1     Nov. 16, 2017

Related U.S. Application Data

(63) Continuation of application No. 15/015,409, filed on Feb. 4, 2016, now Pat. No. 9,772,657.

(Continued)

(30) Foreign Application Priority Data

Aug. 26, 2015     (KR) ...................... 10-2015-0120541

(51) Int. Cl.
*G06F 1/16*      (2006.01)
*G09F 9/30*      (2006.01)
*H04M 1/02*      (2006.01)

(52) U.S. Cl.
CPC .......... *G06F 1/1652* (2013.01); *G06F 1/1615* (2013.01); *G06F 1/1679* (2013.01);
(Continued)

(58) Field of Classification Search
CPC .... G06F 1/1615; G06F 1/1652; G06F 1/1679; G09F 9/301; H04M 1/0268
See application file for complete search history.

(56) References Cited

U.S. PATENT DOCUMENTS

| | | | | |
|---|---|---|---|---|
| 6,771,232 B2 * | 8/2004 | Fujieda | ................ | G06F 1/1615 345/30 |
| 7,395,850 B2 | 7/2008 | Chino et al. | | |

(Continued)

FOREIGN PATENT DOCUMENTS

| | | |
|---|---|---|
| JP | 5284238 B2 | 9/2013 |
| KR | 1998-0087721 A | 12/1998 |

(Continued)

*Primary Examiner* — Adrian S Wilson
(74) *Attorney, Agent, or Firm* — Jefferson IP Law, LLP

(57) ABSTRACT

A rollable display device is provided. The rollable display device includes first and second bodies, a display, a roller supported in the first body to be rotatable, to which one end portion of the display in a length direction of the display is fixed and around an outer circumference of which the display is wound, and a support member a plurality of segmented links connected to pivot around a hinge shaft perpendicular to an image display surface, the support member being accommodated in an accommodation unit provided in the first body. As the first body is separated from the second body, the display is unwound from the roller and is unrolled outward from the first body to expand in the length direction, and the support member is unrolled outward from the first body in the length direction to support a rear surface of the display.

20 Claims, 40 Drawing Sheets

Related U.S. Application Data

(60) Provisional application No. 62/155,033, filed on Apr. 30, 2015.

(52) U.S. Cl.
CPC ......... *G09F 9/301* (2013.01); *H04M 1/0268* (2013.01); *G06F 2203/04102* (2013.01); *G09G 2380/02* (2013.01)

(56) References Cited

U.S. PATENT DOCUMENTS

| | | | | |
|---|---|---|---|---|
| 7,724,508 | B2 * | 5/2010 | Bemelmans | G06F 1/1615 |
| | | | | 345/168 |
| 7,864,418 | B2 * | 1/2011 | Kuroi | F16M 11/38 |
| | | | | 160/377 |
| 7,952,801 | B2 * | 5/2011 | Yuzawa | G03B 21/56 |
| | | | | 359/443 |
| 8,009,422 | B2 * | 8/2011 | Misawa | G02F 1/133305 |
| | | | | 345/156 |
| 8,184,369 | B2 * | 5/2012 | Kuroi | G03B 21/58 |
| | | | | 359/443 |
| 8,493,726 | B2 | 7/2013 | Visser et al. | |
| 8,516,728 | B2 | 8/2013 | Jung | |
| 8,654,519 | B2 * | 2/2014 | Visser | G09F 9/00 |
| | | | | 361/679.21 |
| 8,925,614 | B2 * | 1/2015 | Okachi | E06B 9/54 |
| | | | | 160/31 |
| 9,004,138 | B2 | 4/2015 | Okachi et al. | |
| 9,337,434 | B2 * | 5/2016 | Lindblad | H01L 51/52 |
| 9,772,657 | B2 * | 9/2017 | Takayanagi | G06F 1/1615 |
| 9,823,697 | B2 * | 11/2017 | Hsu | G06F 1/1618 |
| 2002/0090980 | A1 * | 7/2002 | Wilcox | G06F 1/1601 |
| | | | | 455/566 |
| 2004/0183958 | A1 * | 9/2004 | Akiyama | G02F 1/133305 |
| | | | | 349/58 |
| 2005/0041012 | A1 * | 2/2005 | Daniel | G06F 1/1601 |
| | | | | 345/156 |
| 2009/0302176 | A1 | 12/2009 | Kuroi et al. | |
| 2010/0177020 | A1 | 7/2010 | Bemelmans et al. | |
| 2011/0018785 | A1 | 1/2011 | Aoki | |
| 2011/0176260 | A1 | 7/2011 | Walters et al. | |
| 2012/0204453 | A1 | 8/2012 | Jung | |
| 2014/0211399 | A1 | 7/2014 | O'Brien | |
| 2014/0241551 | A1 | 8/2014 | Kim et al. | |
| 2014/0247544 | A1 | 9/2014 | Ryu | |
| 2015/0029229 | A1 | 1/2015 | Voutsas | |

FOREIGN PATENT DOCUMENTS

| | | |
|---|---|---|
| KR | 10-2012-0093665 A | 8/2012 |
| WO | 2007-072234 A1 | 6/2007 |
| WO | 2008-140308 A1 | 11/2008 |
| WO | 2013-033479 A2 | 3/2013 |

* cited by examiner

ROLLABLE DISPLAY DEVICE

CROSS-REFERENCE TO RELATED APPLICATION(S)

This application is a continuation application of prior application Ser. No. 15/015,409, filed on Feb. 4, 2016, which claimed the benefit under 35 U.S.C. § 119(e) of a U.S. Provisional application filed on Apr. 30, 2015 in the U.S. Patent and Trademark Office and assigned Ser. No. 62/155,033, and under 35 U.S.C. § 119(a) of a Korean patent application filed on Aug. 26, 2015 in the Korean Intellectual Property Office and assigned Serial number 10-2015-0120541, the entire disclosure of each of which is hereby incorporated by reference.

TECHNICAL FIELD

The present disclosure relates to a rollable display device having a structure in which a flexible display may be accommodated in a body of the rollable display device or is outwardly expandable.

BACKGROUND

Electronic apparatuses such as televisions, monitors, communication terminals, game devices, multimedia devices, portable computers, photographing apparatuses, etc. include a display for displaying image information. Since traditional displays are not bendable or foldable, the size of a display determines the size of an electronic apparatus including the display. Accordingly, when a large display is adopted, the size of an electronic apparatus having the large display increases accordingly.

With the development of flexible displays capable of being rolled up, a rollable display device has been suggested, in which a display wound around a roller may be unrolled outward from the roller for use when desired.

However, in the rollable display device having the above structure, when a force perpendicularly acts on a screen of a display outwardly expanded from the body, the display may not be maintained in a flat expanded state and thus an image displayed on the display may be distorted. Accordingly, a support structure to support the outwardly expanded display to keep it flat is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a rollable display device in which a support member for supporting a display and the display are separately accommodated in a body of the rollable display device.

Another aspect of the present disclosure is to provide a rollable display device in which a display may be supported in a flatly expanded state.

Additional aspects will be set forth in part in the description which follows and, in part, will be apparent from the description, or may be learned by practice of the presented various embodiments.

In accordance with an aspect of the present disclosure, a rollable display is provided. The rollable display device includes first and second bodies, a display having an image display surface and a rear surface, a roller supported in the first body to be rotatable around a rotation axis in a width direction of the display, to which one end portion of the display in a length direction of the display is fixed and around an outer circumference of which the display is wound, and a support member having a plurality of segmented links connected to pivot around a hinge shaft perpendicular to the image display surface between an expanded state and a bent state in one direction, the support member being accommodated in an accommodation unit provided in the first body, in which the display is unwound from the roller and is unrolled outward from the first body to expand in the length direction as the first body is separated from the second body, and the support member is unrolled outward from the first body in the length direction to support the rear surface of the display as the first body is separated from the second body.

The accommodation unit may extend in the width direction of the display.

The rollable display device may further include a sprocket provided in the first body that is rotatable around a rotation axis perpendicular to the image display surface and that moves the support member.

The sprocket may change a movement direction of the support member from the width direction to the length direction of the display when the support member is unrolled outward from the first body, and from the length direction to the width direction of the display when the support member is rolled back into the first body.

The support member may support an edge in the width direction of the display.

A rib extending to the image display surface over the edge may be provided in each of the plurality of segmented links.

The sprocket may be disposed adjacent to the edge of the display, a plurality of connection members having a first connection portion may be provided at the edge of the display, and a second connection portion connected to the first connection portion may be provided at the plurality of segmented links.

The first connection portion and the second connection portion may be connected to each other or disconnected from each other by the sprocket when a movement direction of the plurality of segmented links is changed between the length direction and the width direction.

The first connection portion ma have a shape of a protrusion extending in the width direction of the display, and the second connection portion may have a shape of a groove into which the first connection portion is inserted.

Intervals between the plurality of connection members may be the same as intervals between the plurality of segmented links.

Intervals between the plurality of connection members may be intervals at which the plurality of connection members are aligned in a radial direction of the roller at a plurality of positions along a circumferential direction of the roller when the display is wound around the roller.

A protruding portion and a concave portion may be provided in the connection member, and the protruding portion of the connection member disposed outwardly may be inserted into the concave portion of the connection member disposed inwardly in a state in which the connection members are aligned in the radial direction.

The protruding portion may include an elastic arm, the concave portion may include an accommodation portion accommodating the elastic arm and having an opening whose width is smaller than a width of the elastic arm and a protruding step provided at an edge of the opening to catch the elastic arm, and the elastic arm of the connection member disposed outwardly may be inserted into the accommodation portion of the connection member disposed inwardly in the state in which the connection members are aligned in the radial direction.

The connection member may include a first magnetic member and a second magnetic member, the second magnetic member of the connection member disposed inwardly and the first magnetic member of the connection member disposed outwardly may be attracted to each other by a magnetic force in a state in which the connection members are aligned in the radial direction.

The connection member may include a first facing portion and a second facing portion, a friction portion may be provided at at least one of the first and second facing portions, and the second facing portion of the connection member disposed inwardly and the first facing portion of the connection member disposed outwardly contact each other in a state in which the connection members may be aligned in the radial direction.

The connection member may include a first facing portion and a second facing portion, a slip prevention member may be provided between the plurality of connection members, and the second facing portion of the connection member disposed inwardly and the first facing portion of the connection member disposed outwardly contact each other in a state in which the connection members may be aligned in the radial direction.

The support member may include first and second support members supporting opposite edges in the width direction of the display.

Pivot directions of the plurality of segmented links of the first and second support members may be opposite to each other.

The sprocket may include first and second sprockets disposed adjacent to the opposite edges in the width direction of the display, a plurality of connection members having a first connection portion may be provided at the opposite edges of the display, and a second connection portion connected to the first connected portion may be provided at the plurality of segmented links of the first and second support members.

The first connection portion and the second connection portion may be connected to each other or disconnected from each other when movement directions of the first and second support members are changed by the first and second sprockets between the length direction and the width direction.

An interval between the plurality of connection members may be an interval at which the plurality of connection members are aligned in a radial direction of the roller at a plurality of positions along a circumferential direction of the roller when the display is wound around the roller.

The support member may include first and second support members supporting the rear surface of the display at positions separated from each other in the width direction of the display, and pivot directions of the plurality of segmented links of the first and second support members may be opposite to each other.

The rollable display device may further include a locking unit locking the first body at a plurality of separation positions with respect to the second body.

The locking unit may include a blocking member having a blocking position and an unblocking position whereby a movement of the support member in an accommodation direction to be accommodated in the first body is prevented at the blocking position and allowed at the unblocking position.

At the blocking position, the blocking member may prevent a segmented link, which is disposed before a segmented link that is engaged with the sprocket, from moving in the accommodation direction.

When the support member is unrolled outward from the first body, the blocking member may interfere with the segmented link to be switched from the blocking position to the unblocking position.

The locking unit may further include an elastic member that applies an elastic force to the blocking member in such a direction that the blocking member is switched to the blocking position.

The locking unit may further include a plurality of protruding steps provided at the sprocket, and the blocking member may prevent the sprocket from rotating in a direction in which the support member is moved in the accommodation direction, by being caught by one of the protruding steps at the blocking position.

When the sprocket rotates in a direction in which the support member is unrolled outward from the first body, the blocking member may interfere with the protruding steps to be switched to the unblocking position.

The locking unit may further include an elastic member to apply to the blocking member an elastic force in such a direction that the blocking member is switched to the blocking position.

Another end portion of the display in a length direction of the display may be fixed to the second body, and one end portion of the support member may be fixed to the second body.

The first body may include a pair of first bodies disposed at opposite sides with respect to the second body in the length direction, the roller may be provided at each of the pair of first bodies, wherein the one end portion and the other end portion of the display are fixed to the pair of rollers, and the support member may be provided across the pair of first bodies and a part of the support member is fixed to the second body.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
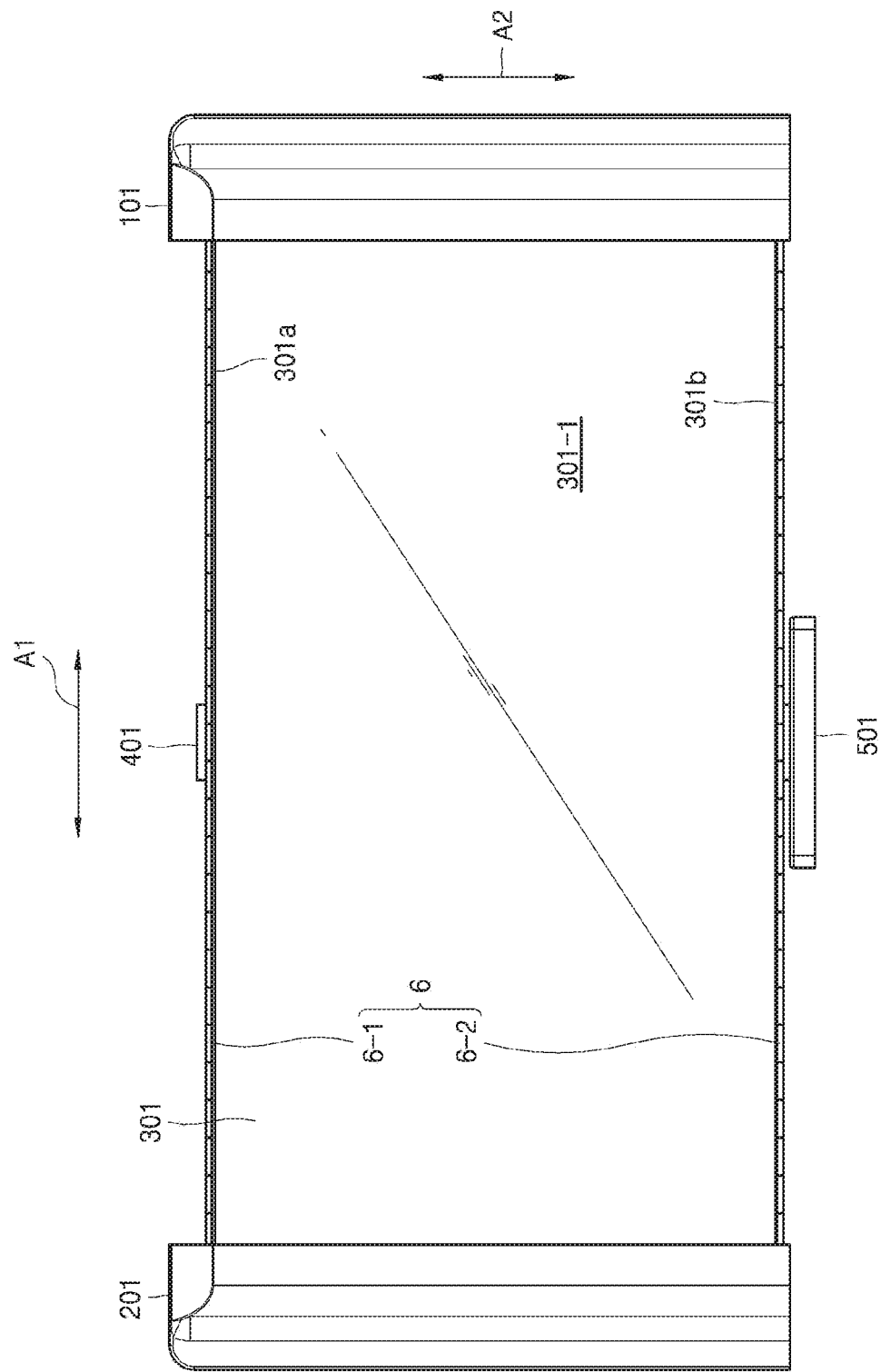
FIG. 1 is a front view of a rollable display device in an open state, according to an embodiment of the present disclosure.
Figure 2:
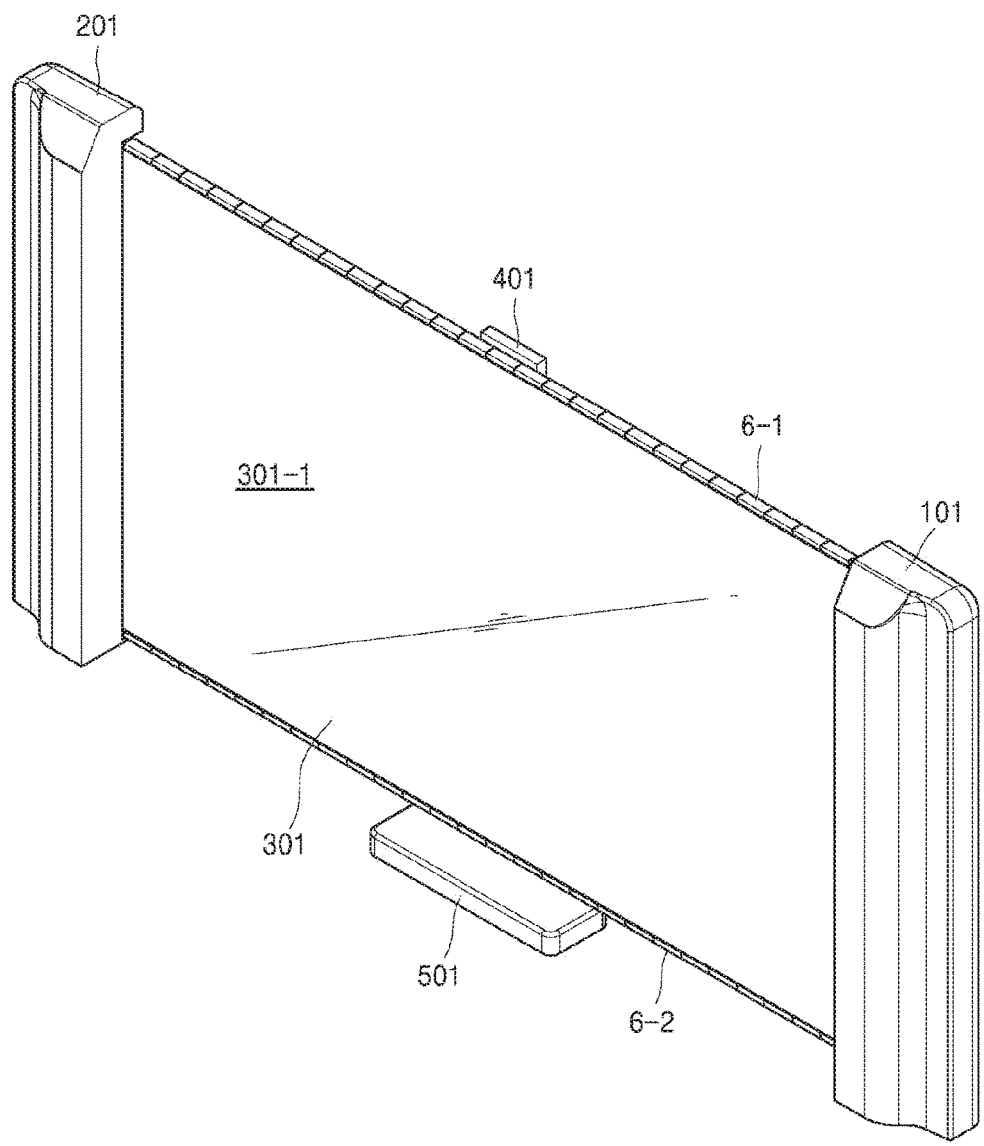
FIG. 2 is a front perspective view of the rollable display device of FIG. 1 according to an embodiment of the present disclosure.
Figure 3:
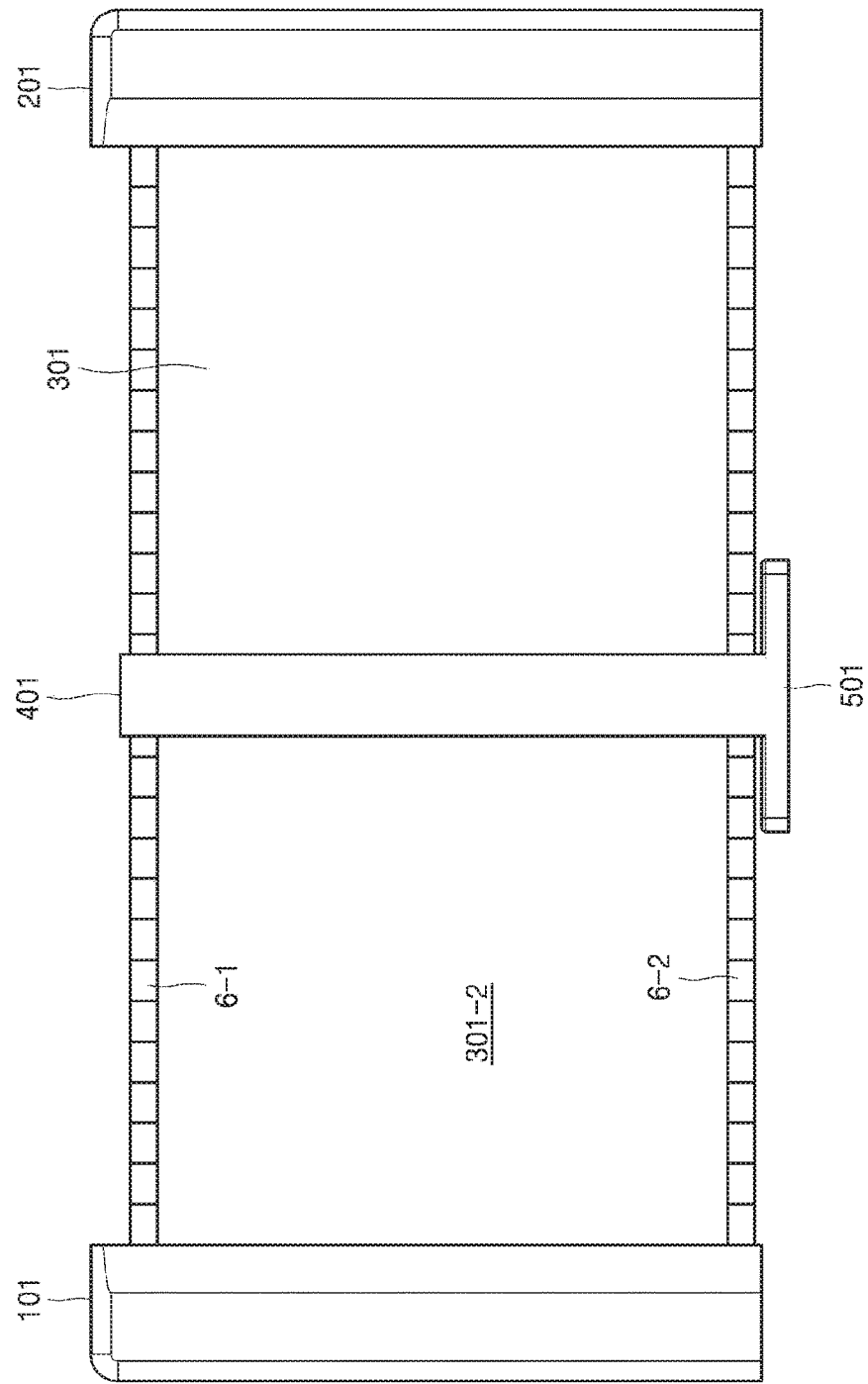
FIG. 3 is a rear view of the rollable display device of FIG. 1 according to an embodiment of the present disclosure.
Figure 4:
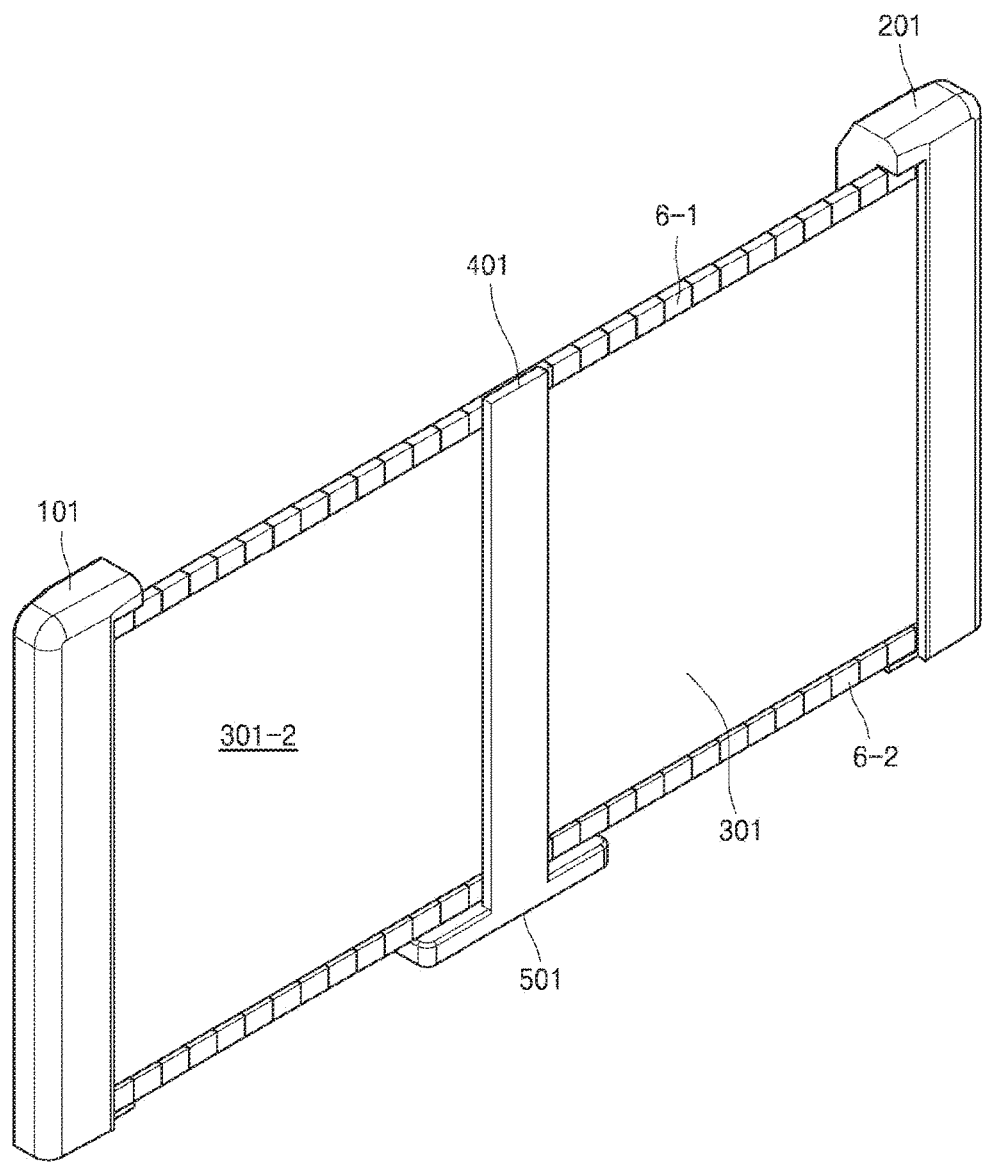
FIG. 4 is a rear perspective view of the rollable display device of FIG. 1 according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the present disclosure allows for various changes and numerous embodiments, various embodiments will be illustrated in the drawings and described in detail in the written description. However, this is not intended to limit the present disclosure to particular modes of practice, and it is to be appreciated that various modifications, equivalents, and/or alternatives that do not depart from the spirit and technical scope of the present disclosure are encompassed in the present disclosure. In the description of the present disclosure, certain detailed explanations of the related art are omitted when it is deemed that they may unnecessarily obscure the essence of the disclosure.

In the present disclosure, it is to be understood that the terms such as "including," "having," and "comprising" are intended to indicate the existence of the features, numbers, steps, actions, components, parts, or combinations thereof disclosed in the disclosure, and are not intended to preclude the possibility that one or more other features, numbers, steps, actions, components, parts, or combinations thereof may exist or may be added.

In the present disclosure, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements regardless of an order and/or importance and to distinguish one constituent element from another constituent element, but the constituent elements are not limited by the terms. For example, a first user device and a second user devise may denote different user devices regardless of an order and/or importance. For example, without departing from the right scope of the present disclosure, a first constituent element may be referred to as a second constituent element, and vice versa.

In the present disclosure, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween. Other expressions, such as, "between" and "directly between", describing the relationship between the constituent elements, may be construed in the same manner.

In the present disclosure, the expression "configured to" may be interchangeable with an expression such as "suitable for", "having the capacity to", "designed to", "adapted to", "made to", or "capable of". The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a central processing unit (CPU) or an application processor, capable of performing the functions by executing one or more software programs stored in a memory device.

The terms used in the present disclosure have been selected from currently widely used general terms in consideration of the functions in the present disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the present disclosure are defined based on their meanings in relation to the contents discussed throughout the disclosure, not by their simple meanings.

In the present disclosure, the term "rollable display device" may signify, for example, TV's, smartphones, tablet personal computers, mobile phones, video phones, e-book readers, desktop personal computers, laptop personal computers, netbook computers, etc.

In the present disclosure, the term "user" may signify a person who uses a rollable display device.

Figure 5:
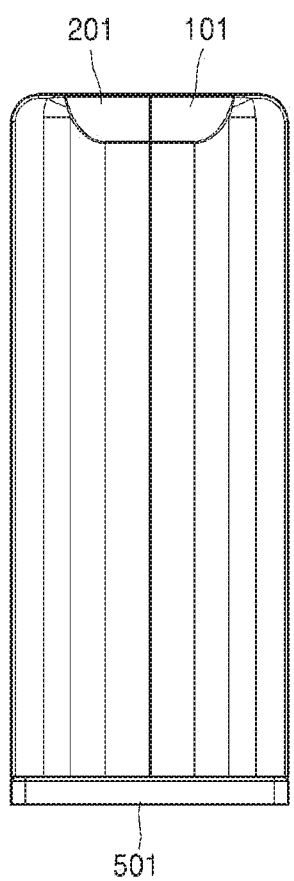
FIG. 5 is a front view of the rollable display device of FIG. 1 in a closed state according to an embodiment of the present disclosure.
Figure 6:
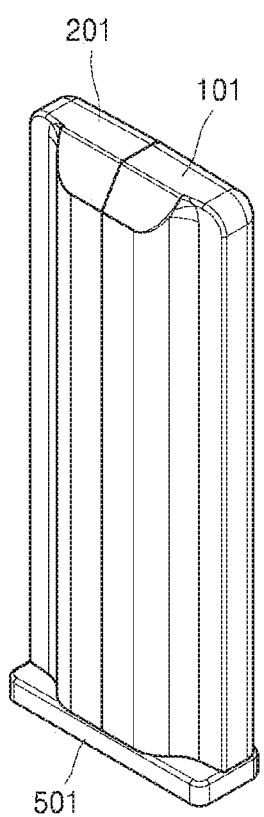
FIG. 6 is a perspective view of the rollable display device of FIG. 1 in the closed state according to an embodiment of the present disclosure.
Figure 7:
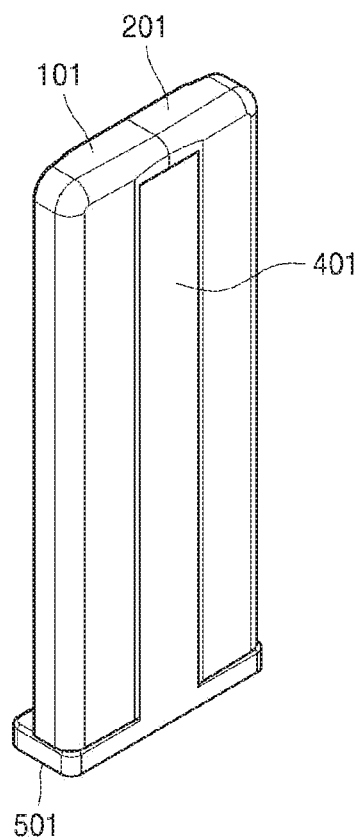
FIG. 7 is a rear perspective view of the rollable display device of FIG. 1 in the closed state according to an embodiment of the present disclosure.

FIGS. 1 to 4 are, respectively, a front view, a front perspective view, a rear view, and a rear perspective view of a rollable display device in an open state according to an embodiment of the present disclosure. FIGS. 5 to 7 are, respectively, a front view, a front perspective view, and a rear perspective view of a rollable display device in a closed state according to an embodiment of the present disclosure.

Referring to FIGS. 1 to 7, a rollable display device may include a pair of first bodies 101 and 201 and a second body 401. The first bodies 101 and 201 are disposed at both sides of the second body 401. The second body 401 may include a stand 501. The second body 401 may be fixed to the stand 501 and may be incorporated with the stand 501.

Referring to FIGS. 5 to 7, in the state in which the first bodies 101 and 201 are in a state of completely approaching the second body 401, that is, in a closed state, a display 301 is accommodated in the first bodies 101 and 201. In the closed state, the first bodies 101 and 201 and the second body 401 are located adjacent to each other, the display 301 may not be exposed to the outside. In the closed state, the total width of the first bodies 101 and 201 and the second body 401 may be the same as the width of the stand 501. In the closed state, the rollable display device may occupy a minimum space.

Referring to FIGS. 1 to 4, in the state in which the first bodies 101 and 201 are separated from the second body 401, that is, in the open state, the display 301 is unrolled outward from the first bodies 101 and 201 to expand between the first bodies 101 and 201. The open state includes a state in which the display 301 completely expands and a state in which the display 301 partially expands.

The rollable display device may be one of televisions, monitors, communication terminals, game devices, multimedia devices, portable computers, photographing apparatuses, etc. In addition, the rollable display device may be any device having a structure in which the first bodies 101 and 201 for accommodating the display 301 and the second body 401 may approach each other or may be spaced apart from each other.

The structure of the display 301 is not particularly limited to the above structure and any structure that is flexibly bent to be accommodated in the first bodies 101 and 201, for example, to be wound around a roller, may be adopted. For example, the display 301 may be a liquid crystal display (LCD), a light-emitting diode (LED) display, an organic light-emitting diode (OLED) display, or an electrophoretic display.

In the closed state, the display 301 is accommodated to be wound round inside the first bodies 101 and 201 and may be unrolled outward from the first bodies 101 and 201 as the first bodies 101 and 201 are spaced apart from the second body 401.

Figure 8:
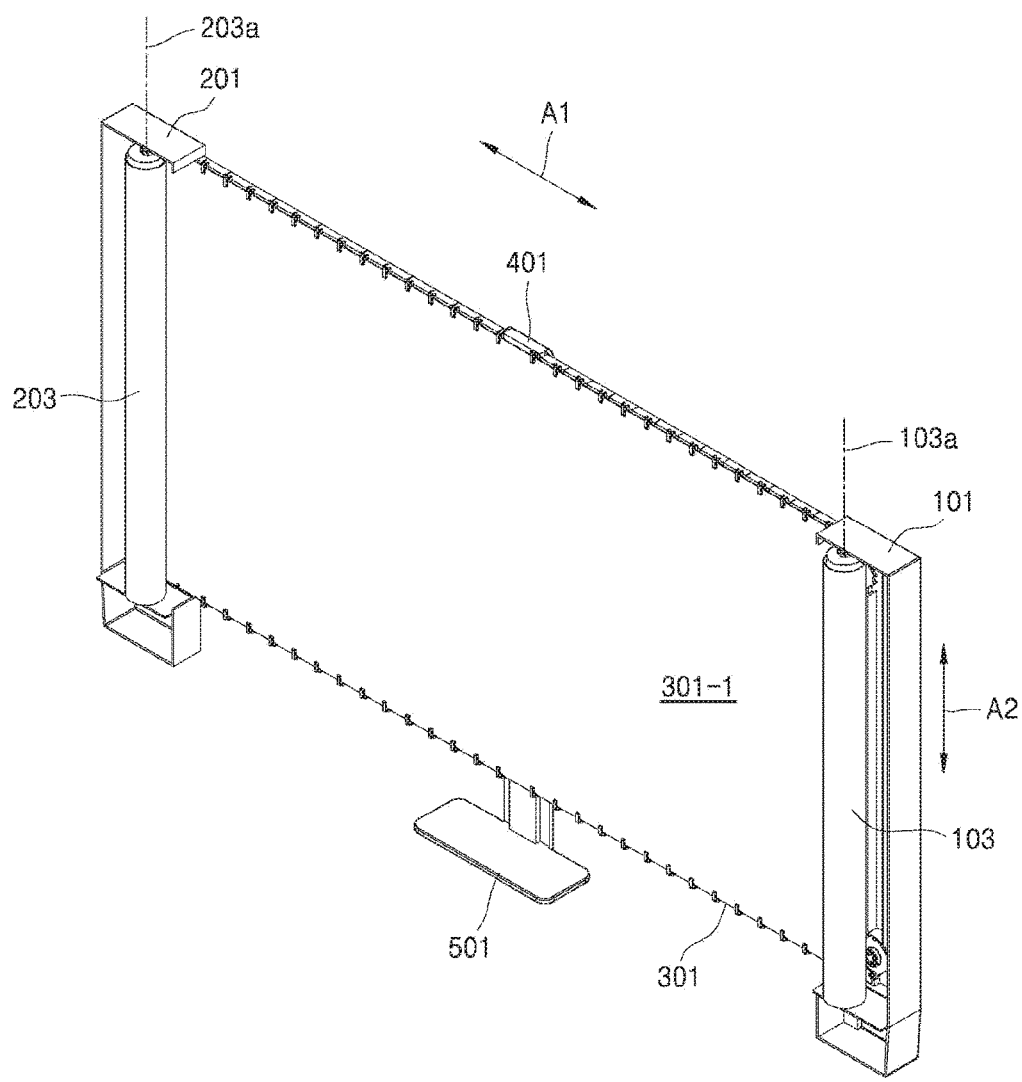
FIG. 8 is a perspective view of an open state of a structure in which a display is accommodated in a first body according to an embodiment of the present disclosure.
Figure 9:
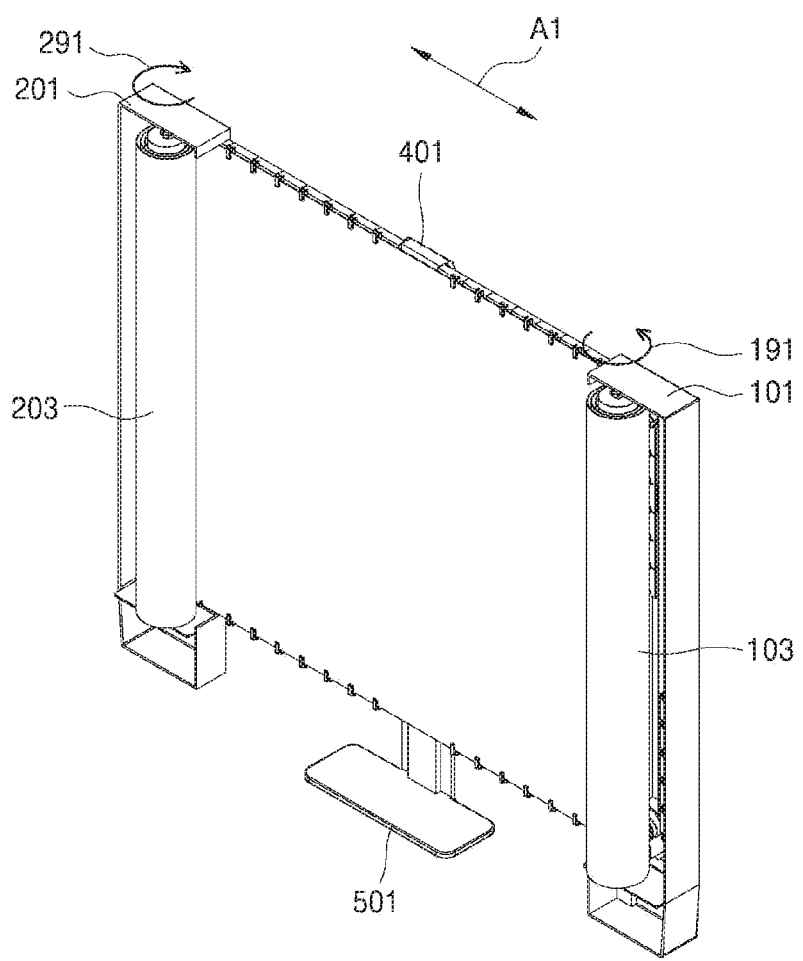
FIG. 9 is a perspective view of a partially open state of the structure in which the display is accommodated in the first body according to an embodiment of the present disclosure.
Figure 10:
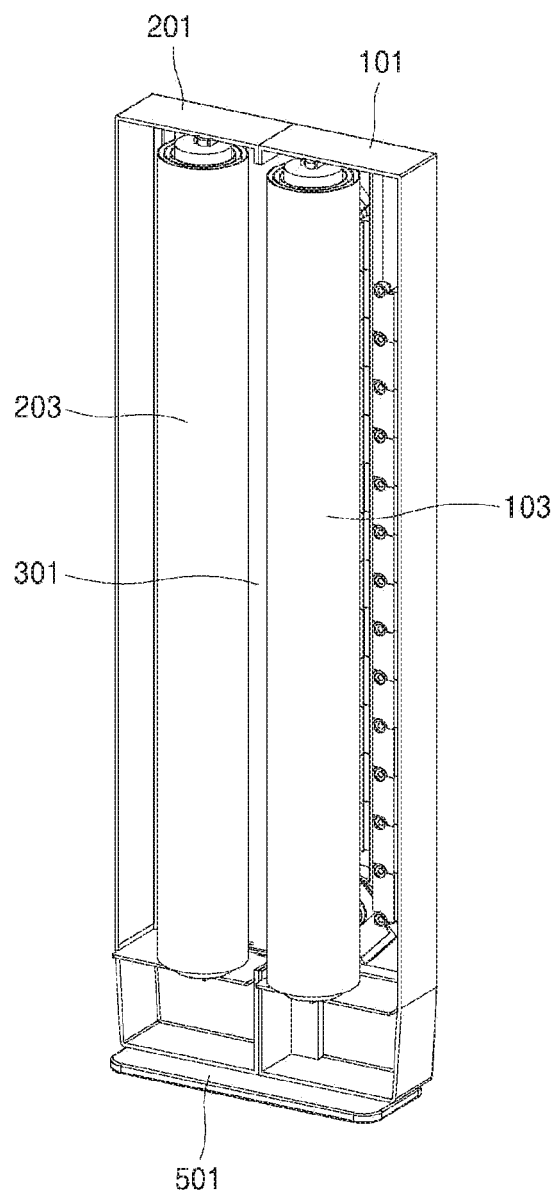
FIG. 10 is an inner perspective view of a closed state of the structure in which the display is accommodated in the first body according to an embodiment of the present disclosure.

FIGS. 8 to 10 are perspective views showing an example in which the display 301 is accommodated in the first bodies 101 and 201, in which FIG. 8 illustrates an open state, FIG. 9 illustrates a partially open state, and FIG. 10 illustrates the closed state. In FIGS. 8 to 10, the first bodies 101 and 201 are illustrated such that the interior thereof may be seen from the outside by partially omitting housings.

Referring to FIGS. 8 to 10, rollers 103 and 203 are respectively installed at the first bodies 101 and 201. The rollers 103 and 203 extend in a width direction A2 of the display 301, and are supported at the first bodies 101 and 201 to be rotatable length direction axes 103a and 203a. One end of a length direction A1 of the display 301 is connected to the roller 103, whereas the other end thereof is connected to the roller 203. The display 301 is wound around outer circumferences of the rollers 103 and 203. In the closed state, as illustrated in FIG. 10, the display 301 is accommodated in the first bodies 101 and 201 in a state of being wound around the rollers 103 and 203.

When the first bodies 101 and 201 in a state of FIG. 10 are moved in the length direction A1 of the display 301 to be separated from the second body 401, a tensile force is applied to the display 301. Accordingly, the rollers 103 and 203 are rotated in a direction in which the display 301 is unrolled as indicated by arrows 191 and 291 in FIG. 9, and thus, the display 301 is unrolled outward from the first bodies 101 and 201 to expand between the first bodies 101 and 201 across the second body 401. When the first bodies 101 and 201 reach the open state, as illustrated in FIG. 8, the display 301 is in a state of expanding at its maximum.

In the open state, when the first bodies 101 and 201 approach the second body 401, the rollers 103 and 203 are rotated in a direction in which the display 301 is wound up. As illustrated in FIG. 10, the display 301 is wound around the rollers 103 and 203 and accommodated in the first bodies 101 and 201. An elastic member (not shown), for example, a torsion spring, may apply an elastic force to the rollers 103 and 203 to have the display 301 wound around the rollers 103 and 203. A structure in which the rollers 103 and 203 wind up the display 301 is not specifically limited. An example of the structure in which the rollers 103 and 203 wind up the display 301 is presented with reference to FIGS. 28 to 30.

The display 301 that is unrolled outward from the first bodies 101 and 201 needs to be maintained in a flat state. When an external force is applied to the display 301, which is in an expanded state, in a direction perpendicular to an image display surface 301-1, the display 301 is not maintained in a flatly expanded state so that an image displayed on the display 301 may be distorted.

Referring to FIGS. 1 to 7, the rollable display device includes a support unit 6 for supporting the display 301 to be flat. The support unit 6 may be accommodated in the first bodies 101 and 201, for example, in the closed state, and may be unrolled outward from the first bodies 101 and 201 to support the display 301 in the open state. The support unit 6 may support a rear surface 301-2 of the display 301, that is, the opposite surface of the image display surface 301-1. In an embodiment of the present disclosure, the support unit 6 may support at least one of opposite edges 301a and 301b of the display 301 in the width direction A2. According to the present disclosure, the support unit 6 may include the first and second support members 6-1 and 6-2 for respectively supporting the edges 301a and 301b of the display 301.

Referring to FIGS. 5 to 7, in the closed state, the first and second support members 6-1 and 6-2 are accommodated in the first bodies 101 and 201. When the first bodies 101 and 201 are spaced apart from the second body 401, as illustrated in FIGS. 1 to 4, the first and second support members 6-1 and 6-2 are unrolled with the display 301 from the first bodies 101 and 201 to be located at the rear surface 301-2 of the display 301 and support the edges 301a and 301b.

Figure 11:
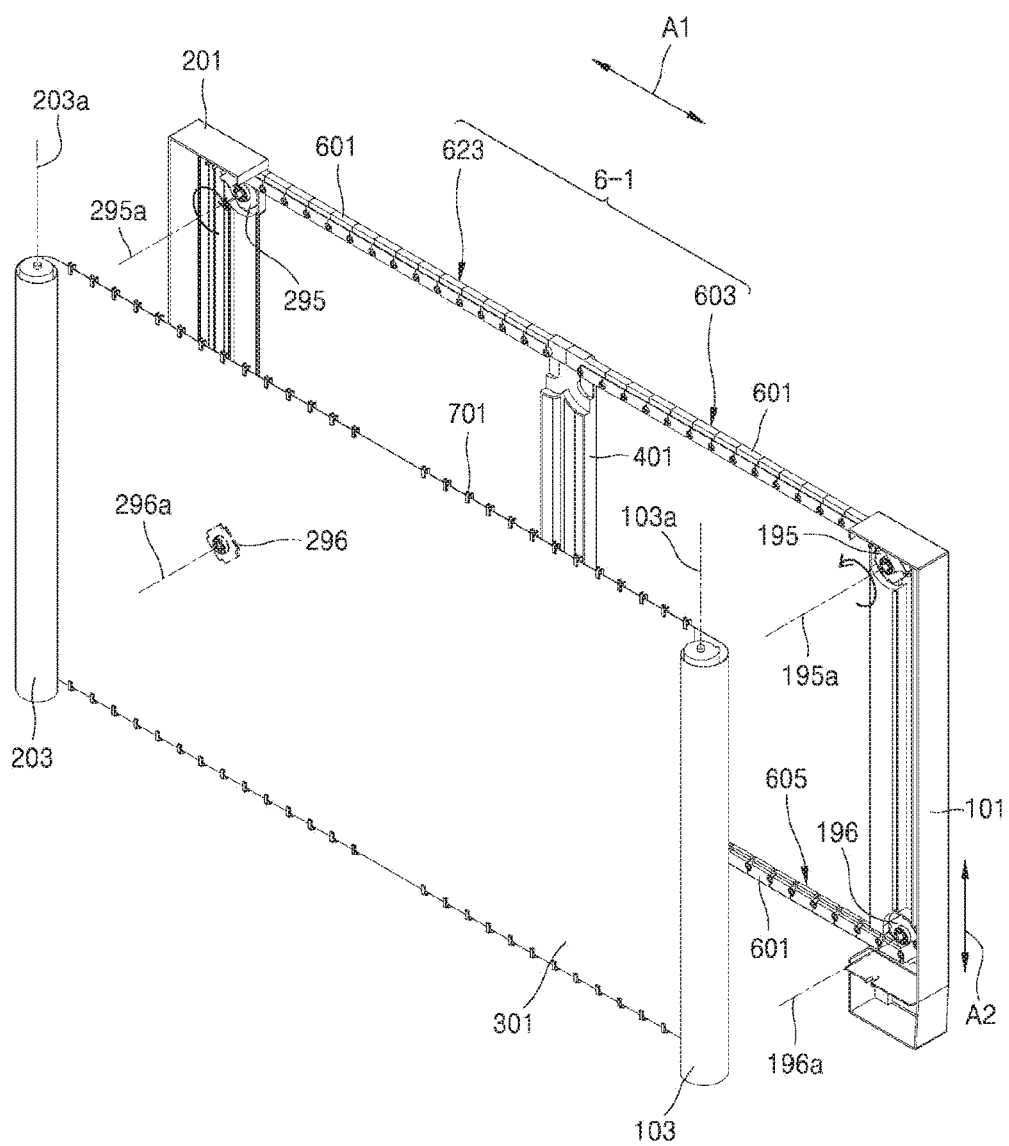
FIG. 11 is an exploded perspective view of a rollable display device adopting a support unit, according to an embodiment of the present disclosure.
Figure 12:
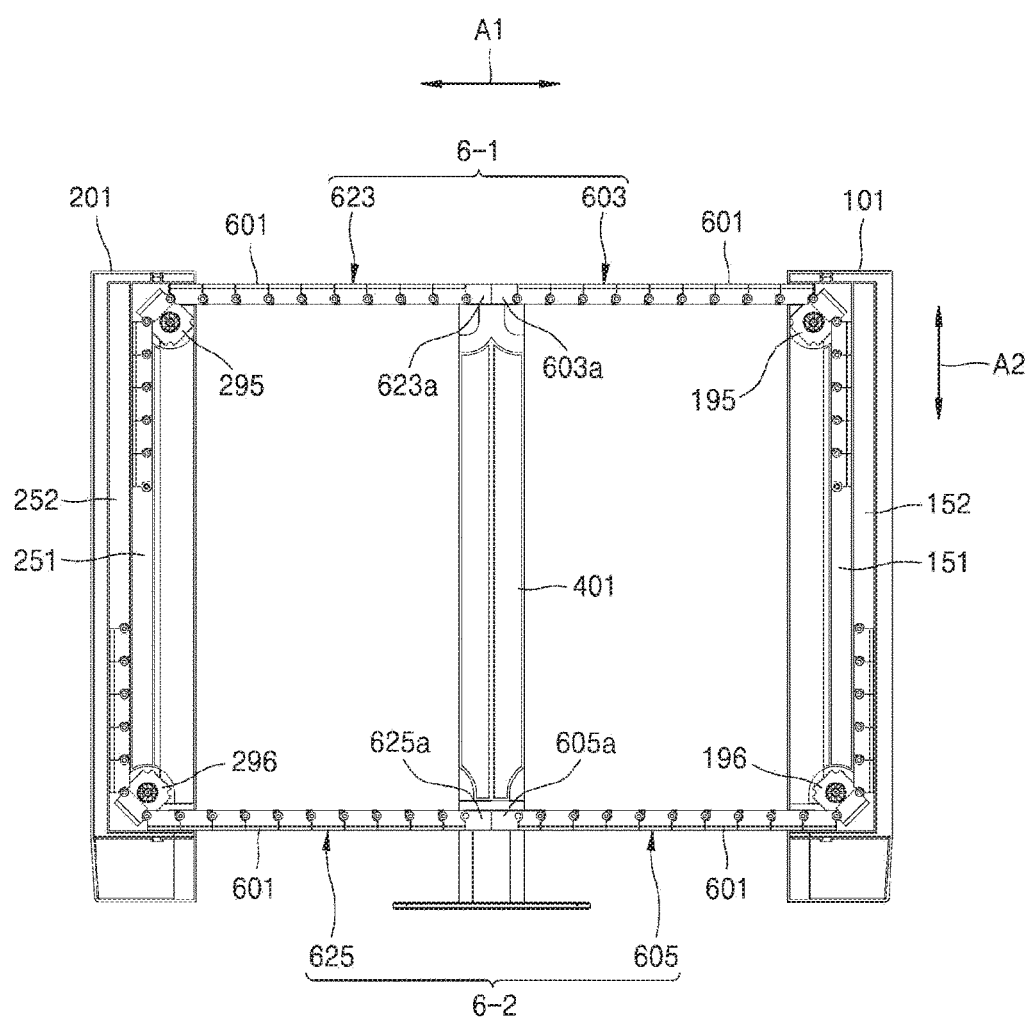
FIG. 12 is a front view of the rollable display device of FIG. 11 in a partially open state according to an embodiment of the present disclosure.
Figure 13:
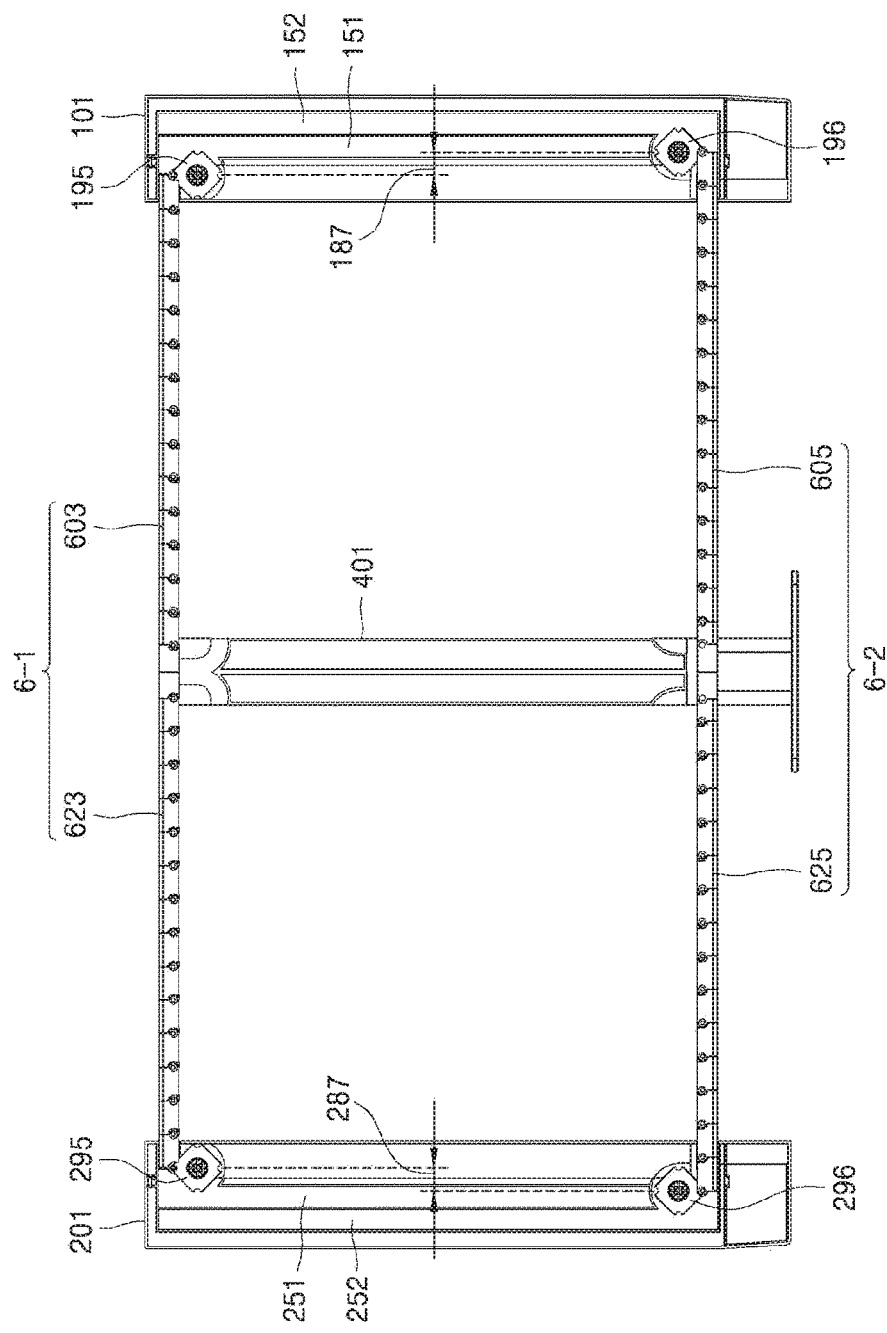
FIG. 13 is a front view of the rollable display device of FIG. 11 in an open state according to an embodiment of the present disclosure.
Figure 14:
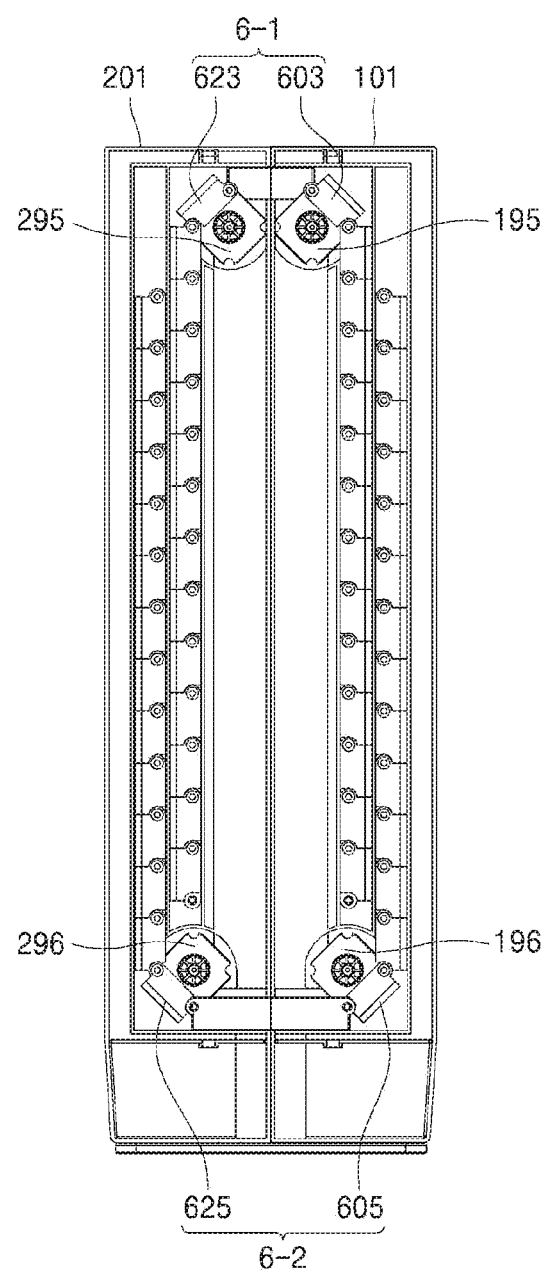
FIG. 14 is a front view of the rollable display device of FIG. 11 in a closed state according to an embodiment of the present disclosure.

An embodiment of the present disclosure, the support unit 6 is described. FIG. 11 is an exploded perspective view of the rollable display device adopting the support unit 6, according to an embodiment of the present disclosure. FIG. 12 is a front view of the rollable display device of FIG. 11 in the partially open state. FIG. 13 is a front view of the rollable display device of FIG. 11 in the open state. FIG. 14 is a front view of the rollable display device of FIG. 11 in the closed state. In FIGS. 11 to 14, the first bodies 101 and 201 are illustrated such that the interior thereof may be seen from the outside by partially omitting the housings.

Referring to FIGS. 11 to 14, the support unit 6 may include the first and second support members 6-1 and 6-2 for respectively supporting the edges 301a and 301b of the display 301. The first and second support members 6-1 and 6-2 are in the form of a chain having a plurality of segmented links 601 pivotably connected to each other. The first support member 6-1 may include a pair of first chains 603 and 623 accommodated in the first bodies 101 and 201. The second support unit 6-2 may include a pair of second chains 605 and 625 respectively accommodated in the first bodies 101 and 201. Each of the first chains 603 and 623 and each of the second chains 605 and 625 are in the form of a chain having the segmented links 601 mutually pivotably connected to each other. Among the segmented links 601 of the first chains 603 and 623 and the second chains 605 and 625, leading links 603a, 605a, 623a, and 625a located at the second body 401 are connected to the second body 401. Each of the first and second support members 6-1 and 6-2 may be a single chain in which one or more segmented links located at the center portion of the each of the first and second support members 6-1 and 6-2, for example, the segmented links 603a and 605a or 623a and 625a, are fixed to the second body 401. An embodiment of the present disclosure of the first and second support members 6-1 and 6-2 is described below with reference to FIGS. 16 and 17.

First and second accommodation units for accommodating the first and second support members 6-1 and 6-2 are respectively provided at the first bodies 101 and 201. For example, the first and second accommodation units 151 and 152 for accommodating the first and second chains 603 and 605 are provided at the first body 101. The first and second accommodation units 151 and 152 may be in the form of, for example, grooves extending in the width direction A2 of the display 301. The first and second accommodation units 151 and 152 are located separated from each other in the length direction A1. Likewise, the first and second accommodation units 251 and 252 for accommodating the first and second chains 623 and 625 are provided at the first body 201. The first and second accommodation units 251 and 252 may be in the form of, for example, grooves extending in the width direction A2 of the display 301. The second accommodation units 251 and 252 may be located separated from each other in the length direction A1.

First and second sprockets for transferring the first and second support members 6-1 and 6-2 into/out of the first bodies 101 and 201 may be provided in the first bodies 101 and 201. The first and second sprockets are located adjacent to the edges 301a and 301b of the display 301. For example, the first and second sprockets 195 and 196 for respectively moving the first and second chains 603 and 605 are provided at the first body 101. The first and second chains 603 and 605 are transferred by the first and second sprockets 195 and 196 in the width direction A2 inside the first body 101 and in the length direction A1 outside the first body 101. In other words, the transfer direction of the first and second chains 603 and 605 is changed by the first and second sprockets 195 and 196. To this end, the first and second sprockets 195 and 196 are supported in the first body 101 to be rotatable around rotation axes 195a and 196a that are perpendicular to the image display surface 301-1. In other words, the rotation axes 195a and 196a are perpendicular to the length direction A1 and the width direction A2. The first and second sprockets 195 and 196 are arranged separated by an interval 187 in the length direction A1 to respectively correspond to the first and second accommodation units 151 and 152. Accordingly, the first and second chains 603 and 605 may be accommodated in the first body 101 to be deviated from each other in the length direction A1. Since the first and second chains 603 and 605 do not interfere with each other, the length of the width direction A2 of the first body 101 to accommodate the first and second chains 603 and 605 may be reduced.

Likewise, the first and second sprockets 295 and 296 for transferring the first and second chains 623 and 625 are provided in the first body 201. The first and second chains 623 and 625 are transferred by the first and second sprockets 295 and 296 in the width direction A2 inside the first body 201 and in the length direction A1 outside the first body 201. In other words, the transfer direction of the second chains 623 and 625 are changed by the first and second sprockets 295 and 296. To this end, the first and second sprockets 295 and 296 are supported in the first body 201 to be rotatable around the rotation axes 295a and 296a that are perpendicular to the image display surface 301-1. In other words, the rotation axes 295a and 296a are perpendicular to the length direction A1 and the width direction A2. The first and second sprockets 295 and 296 are arranged separated by an interval 287 in the length direction A1 to respectively correspond to the first and second accommodation units 251 and 252. Accordingly, the first and second chains 623 and 625 may be accommodated in the first body 201 to be deviated from each other in the length direction A1. Since the first and second chains 623 and 625 do not interfere with each other, the length of the width direction A2 of the first body 201 to accommodate the first and second chains 623 and 625 may be reduced.

The sprockets 195, 196, 295, and 296 may have, for example, a polygonal shape. The length of one side of a polygon may be determined considering the length of each of the segmented links 601. For example, the length of one side of a polygon may be determined considering an interval between hinge shafts 653 of FIG. 16 of the two neighboring segmented links 601. In the present disclosure, although the sprockets 195, 196, 295, and 296 having a rectangular shape are employed, the present disclosure is not limited thereto.

Figure 15:
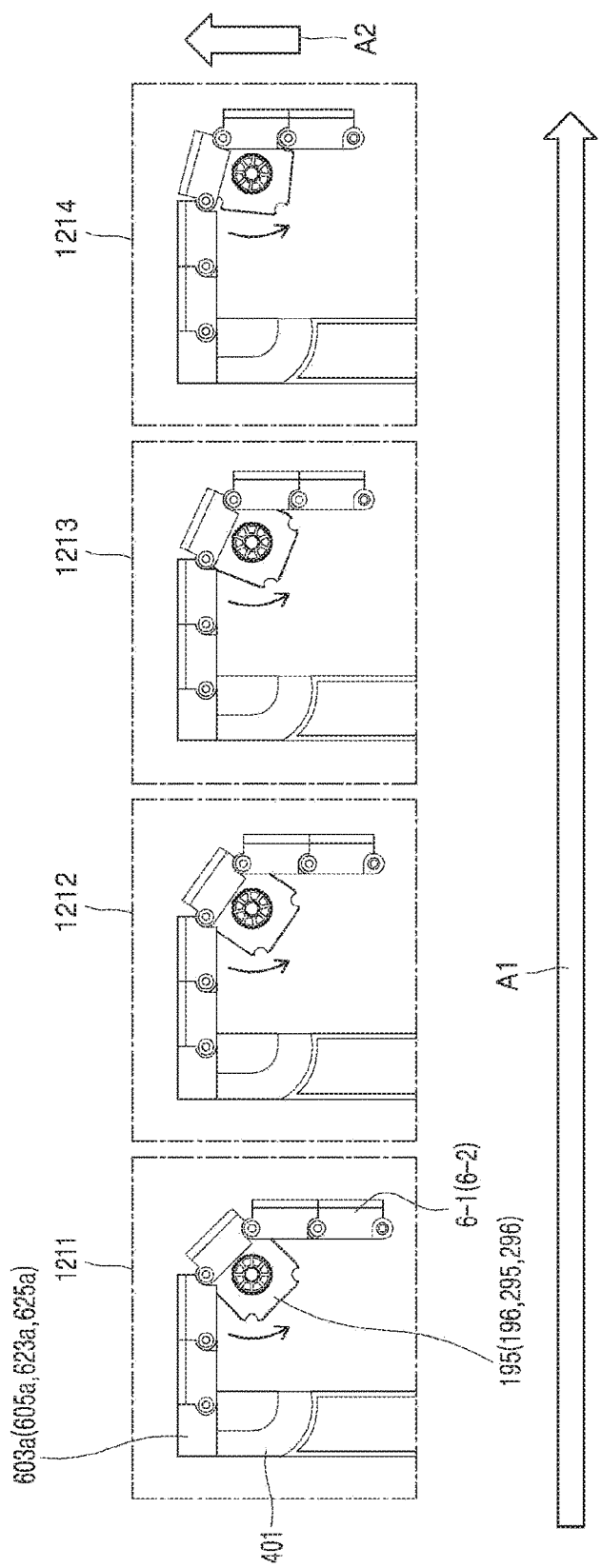
FIG. 15 illustrates a process in which first and second support members are unrolled outward from the first body according to an embodiment of the present disclosure.

In the closed state, the first and second support members 6-1 and 6-2 are accommodated in the first and second accommodation units 151 and 152, and 251 and 252 provided in the first body 101 and 102 of FIG. 14. In this state, when the first bodies 101 and 201 are separated from the second body 401, the first and second support members 6-1 and 6-2 are unrolled outward from the first bodies 101 and 201 to expand between the first bodies 101 and 201 and the second body 401. FIG. 15 illustrates a process in which the first and second support members 6-1 and 6-2 are unrolled outward from the first bodies 101 and 201. Referring to an operation 1211 of FIG. 15, when the first bodies 101 and 201 are separated from the second body 401 in the length direction A1, a tensile force is applied to the first and second support members 6-1 and 6-2 in the length direction A1 because the leading links 603a, 605a, 623a, and 625a are connected to the second body 401. Then, the first and second support members 6-1 and 6-2 are unrolled outward from the first bodies 101 and 201. As the first and second support members 6-1 and 6-2 are unrolled outward from the first bodies 101 and 201, the sprockets 195, 196, 295, and 296 are rotated in directions in which the first and second support members 6-1 and 6-2 is unrolled, as illustrated in operations 1212, 1213, and 1214 of FIG. 15. The directions of the first and second support members 6-1 and 6-2 moving in the width direction A2 inside the first bodies 101 and 201 are changed by the sprockets 195, 196, 295, and 296 to the length direction A1 to be unrolled outward from the first bodies 101 and 201 as illustrated in FIG. 12. Accordingly, the first bodies 101 and 201 may be separated from the second body 401. When reaching the opening state, as illustrated in FIG. 13, the first and second support members 6-1 and 6-2 expand in the length direction A1 to respectively support the edges 301a and 301b of the display 301 that are expanded between the first bodies 101 and 201.

The first and second support members 6-1 and 6-2 are in the form of a chain having the segmented links 601 pivotably connected to each other, but a pivot range thereof is limited. In other words, although the segmented links 601 are not prevented from pivoting in a direction to be wound around the sprockets 195, 196, 295, and 296, the segmented links 601 do not pivot anymore over an expanded state.

Figure 16:
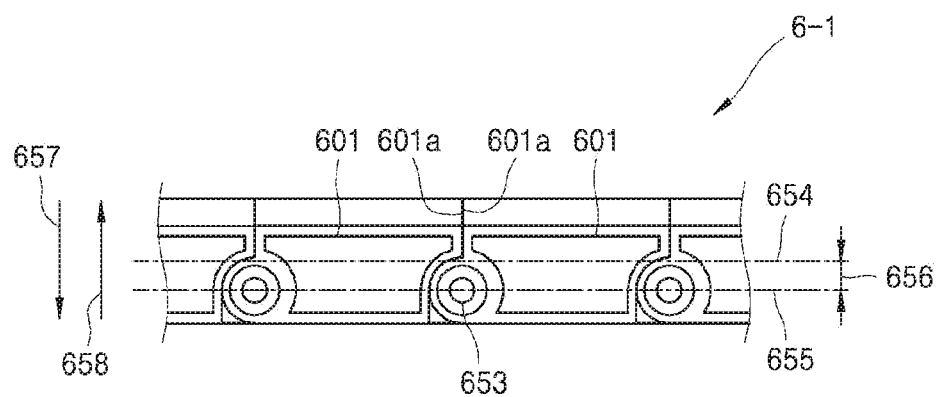
FIGS. 16 and 17 are front views of the first and second support members according to an embodiment of the present disclosure.
Figure 17:
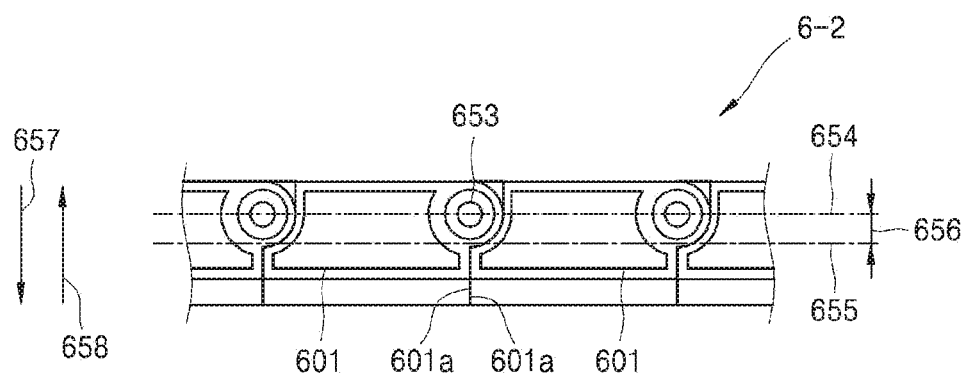

FIGS. 16 and 17 are front views of the first and second support members 6-1 and 6-2. Referring to FIG. 16, the first support member 6-1 is in the form of a chain in which the neighboring segmented links 601 are connected to each other to be pivotable around a hinge shaft 653. The hinge shaft 653 is a shaft perpendicular to the image display surface 301-1. In other words, the hinge shaft 653 is a shaft in a direction perpendicular to the length direction A1 and the width direction A2. Accordingly, the first support member 6-1 is a chain that is bendable on a plane including the display 301. The segmented links 601 are connected to each other to be pivotable between the expanded state and a bent state in one direction. The pivot of the first support member 6-1 in an expanded direction 658 is restricted. To this end, a stopper 601a for restricting the pivot of the first support member 6-1 is provided in the segmented links 601. When the segmented links 601 expand, the neighboring stoppers 601a contact each other so that the pivot of the first support member 6-1 in the expanded direction 658 is restricted. Accordingly, as illustrated in FIG. 1, the edge 301a of the display 301 outwardly unrolled outward from the first bodies 101 and 201 may be supported by the first support member 6-1. A center 655 of the hinge shaft 653 is displaced by an interval 656 from a center 654 of the segmented links 601 in the expanded direction 658. Accordingly, the first support member 6-1 may be easily bent in a direction 657, and the pivot of the first support member 6-1 in the expanded direction 658 is restricted so that the first support member 6-1 may be stably maintained in the expanded state.

Referring to FIG. 17, the second support member 6-2 is in the form of a chain in which the neighboring segmented links 601 are connected to each other to be pivotable around the hinge shaft 653 that is perpendicular to the image display surface 301-1. Accordingly, the second support member 6-2 is a chain that is bendable on a plane including the display 301. The segmented links 601 are connected to each other to be pivotable between the unbent state and the bent state in one direction. The pivot of the second support member 6-2 in the expanded direction 657 is restricted. To this end, the stopper 601a for restricting the pivot of the second support member 6-2 is provided in the segmented links 601. When the segmented links 601 expand, the neighboring stoppers 601a contact each other so that the pivot of the second support member 6-2 in the expanded direction 657 is restricted. Accordingly, as illustrated in FIG. 1, the edge 302a of the display 301 outwardly unrolled outward from the first bodies 101 and 201 may be supported by the second support member 6-2. The center 655 of the hinge shaft 653 is displaced by the interval 656 from the center 654 of the segmented links 601 in the expanded direction 657. Accordingly, the second support member 6-2 may be easily bent in the direction 658, and the pivot of the second support member 6-2 in the expanded direction 657 is restricted so that the second support member 6-2 may be stably maintained in the expanded state.

In the open state of FIG. 13, when the first bodies 101 and 201 approach the second body 401, a compression force in the length direction A1 is applied to the first and second support members 6-1 and 6-2. Then, the first and second support members 6-1 and 6-2 are pushed toward the first bodies 101 and 201. The sprockets 195, 196, 295, and 296 pushed by the first and second support members 6-1 and 6-2 are rotated in a direction in which the first and second support members 6-1 and 6-2 are transferred into the first bodies 101 and 201. The transfer direction of the first and second support members 6-1 and 6-2 is changed by the sprockets 195, 196, 295, and 296 from the length direction A1 to the width direction A2 and thus the first and second support members 6-1 and 6-2 are accommodated in the accommodation units 151, 152, 251, and 252. When reaching the closed state, as illustrated in FIG. 14, the first and second support members 6-1 and 6-2 are completely accommodated in the first bodies 101 and 201. As described above, the display 301 is accommodated in the first bodies 101 and 201 by being wound around the rollers 103 and 203.

According to the above-described structure, the edges 301a and 301b of the display 301 unrolled outward from the first bodies 101 and 201 are supported by the first and second support members 6-1 and 6-2, and thus, the display 301 may be flatly maintained in the open state.

In the case in which a support member is wound around a roller with a display, the diameter of the roller including the display and the support member increases and thus the first bodies 101 and 201 may be increased. According to an embodiment of the present disclosure, since the first and second support members 6-1 and 6-2 are accommodated in the first bodies 101 and 201, separately from the display 301, the size of the first bodies 101 and 201 may be reduced compared to the structure in which the support member is wound around the roller with the display.

Also, for the structure in which the support member is wound around the roller with the display, a pivot shaft of a segmented link forming the support member is a width direction of the display. The support member having the above structure is very weak at an external force in a direction perpendicular to an image display surface of the display. According to the an embodiment of the present disclosure, since the hinge shaft 653 of the segmented links 601 forming the first and second support members 6-1 and 6-2 are perpendicular to the image display surface 301-1, the first and second support members 6-1 and 6-2 has strong resistance to the external force applied to the display 301 in a direction perpendicular to the image display surface 301-1. Accordingly, the display 301 may be stably maintained in a flat state.

The pivot directions of the segmented links 601 of the first and second support members 6-1 and 6-2 are opposite to each other. Accordingly, since the pivot in the opposite directions around the hinge shaft 653 is restricted by the first and second support members 6-1 and 6-2 in the state in which the first and second support members 6-1 and 6-2 are unrolled outward from the first bodies 101 and 201, the display 301 may be stably maintained in the open state.

Figure 18:
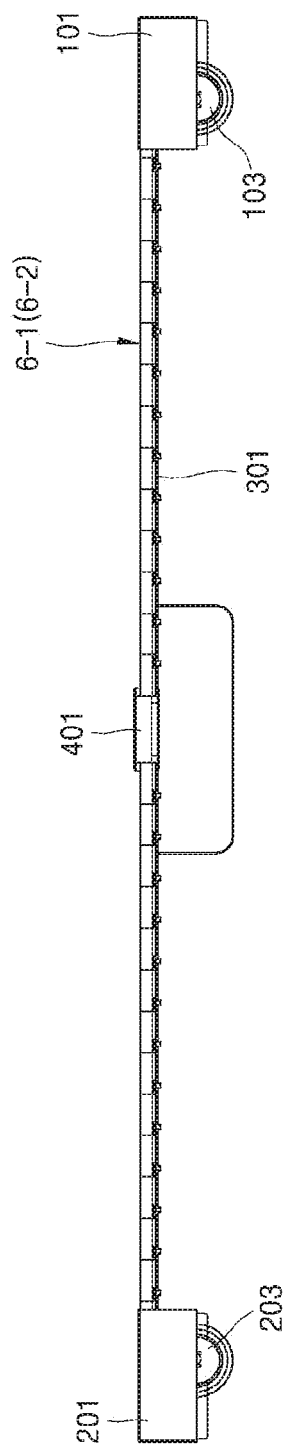
FIG. 18 is a plan view of the rollable display device of FIG. 11 in an open state according to an embodiment of the present disclosure.

FIG. 18 is a plan view of the rollable display device of FIG. 11 in the open state. Referring to FIG. 18, to flatly keep the display 301, the display 301 needs to be maintained in a state of contacting the first and second support members 6-1 and 6-2. When the display 301 is lifted off from the first and second support members 6-1 and 6-2, the display 301 may be difficult to be flatly maintained. To this end, a connection structure to connect the display 301 and the support unit 6 to prevent the display 301 from being lifted from the support unit 6 may be employed in the rollable display device.

Figure 19:
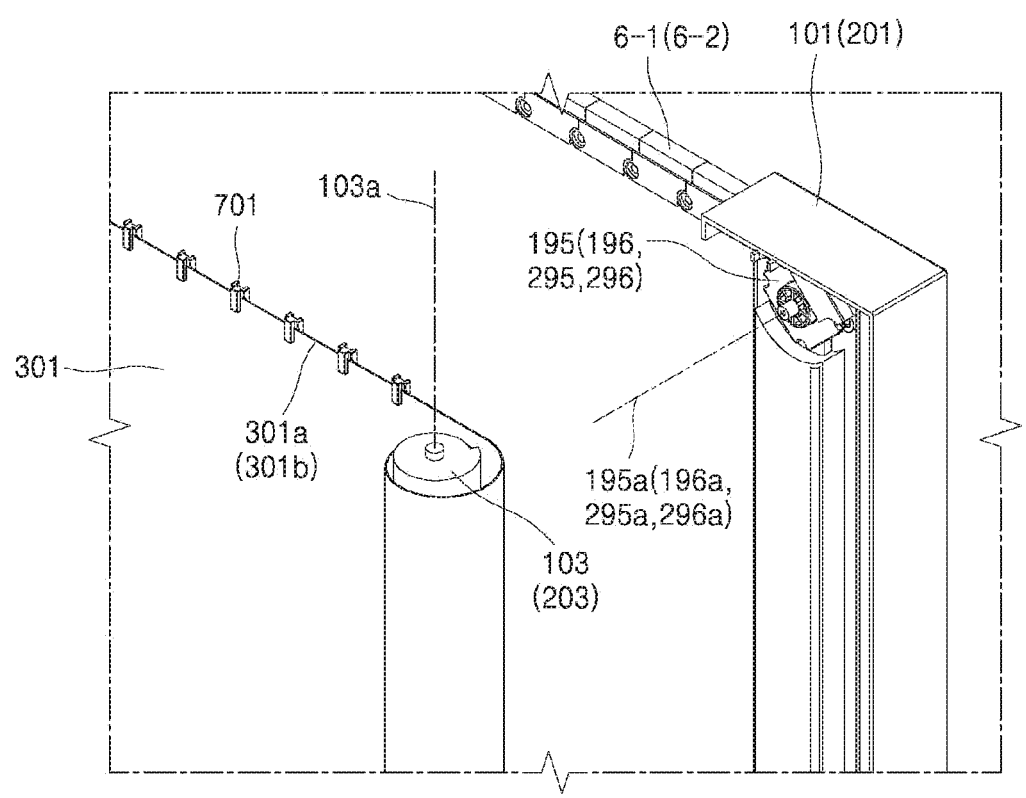
FIG. 19 is an exploded perspective view of a connection structure according to an embodiment of the present disclosure.
Figure 20:
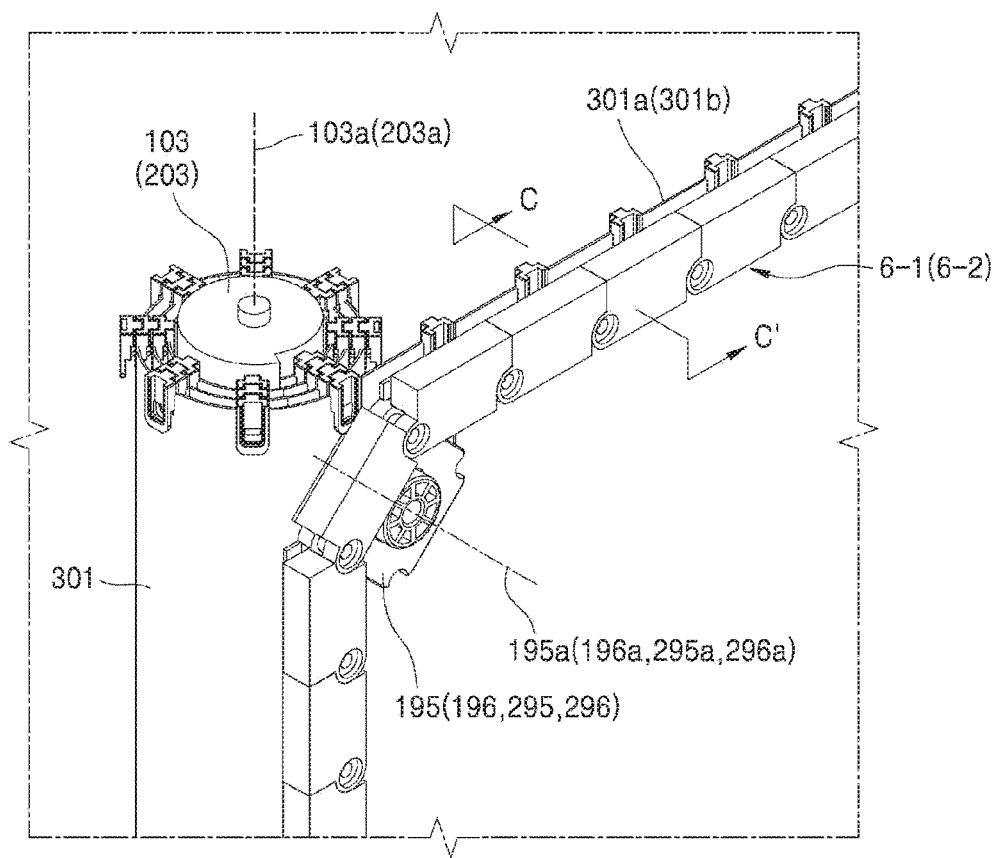
FIG. 20 is a rear perspective view of the connection structure of FIG. 19 according to an embodiment of the present disclosure.
Figure 21:
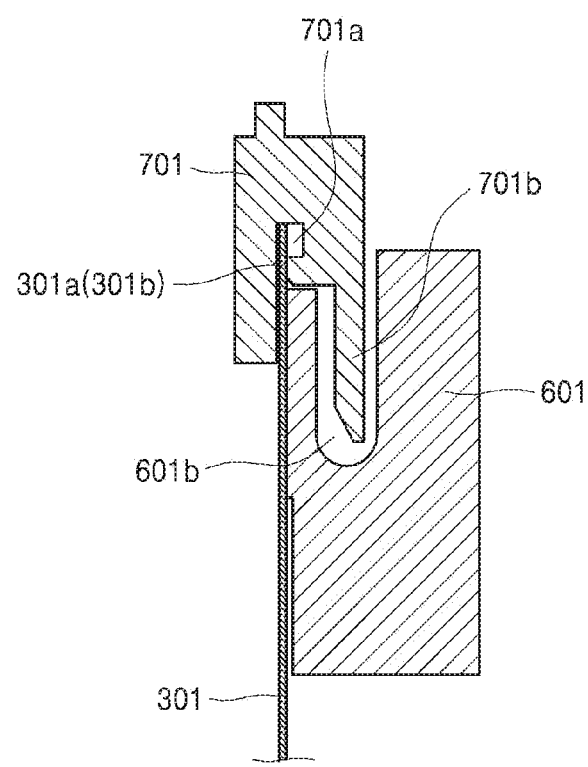
FIG. 21 is a cross-sectional view taken along a line C-C' of FIG. 20 according to an embodiment of the present disclosure.
Figure 22A:
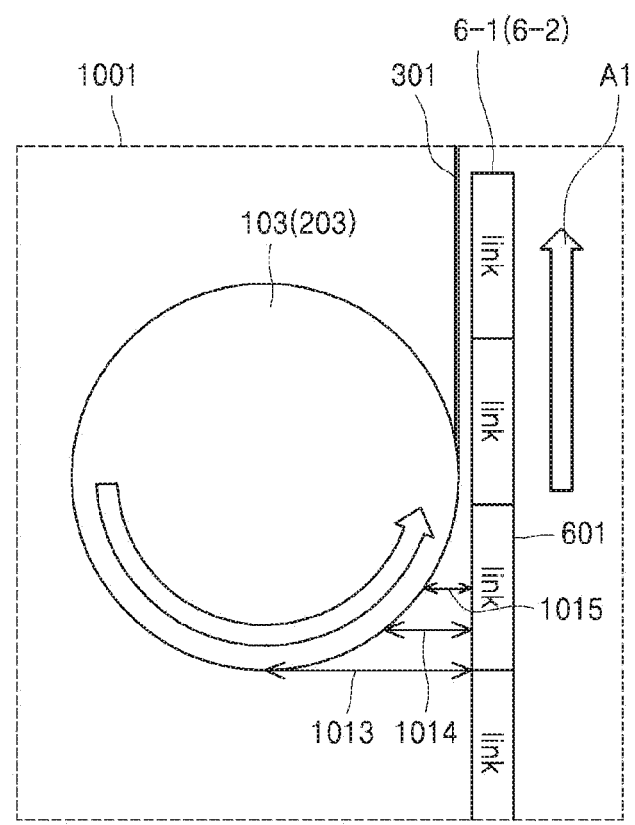
FIGS. 22A and 22B are conceptual views illustrating a process in which a connection member and the support unit are connected to each other according to an embodiment of the present disclosure.
Figure 22B:
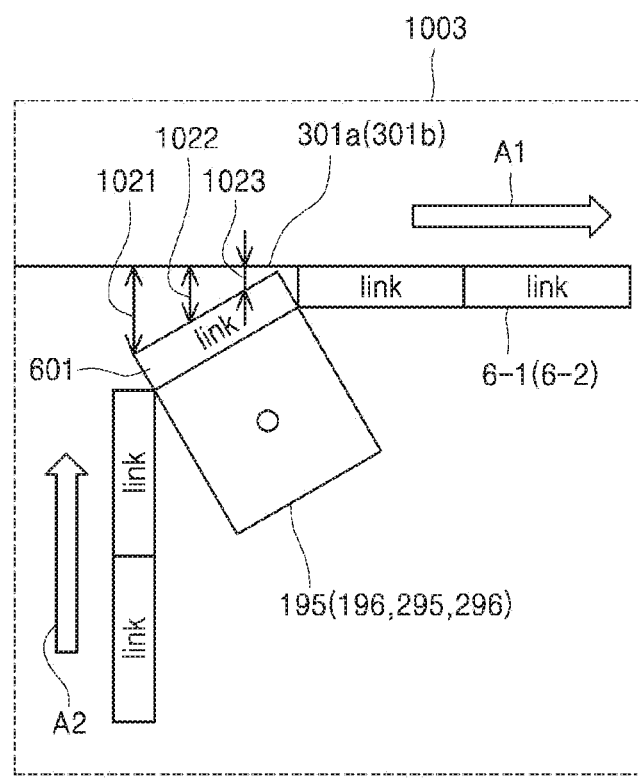
Figure 23A:
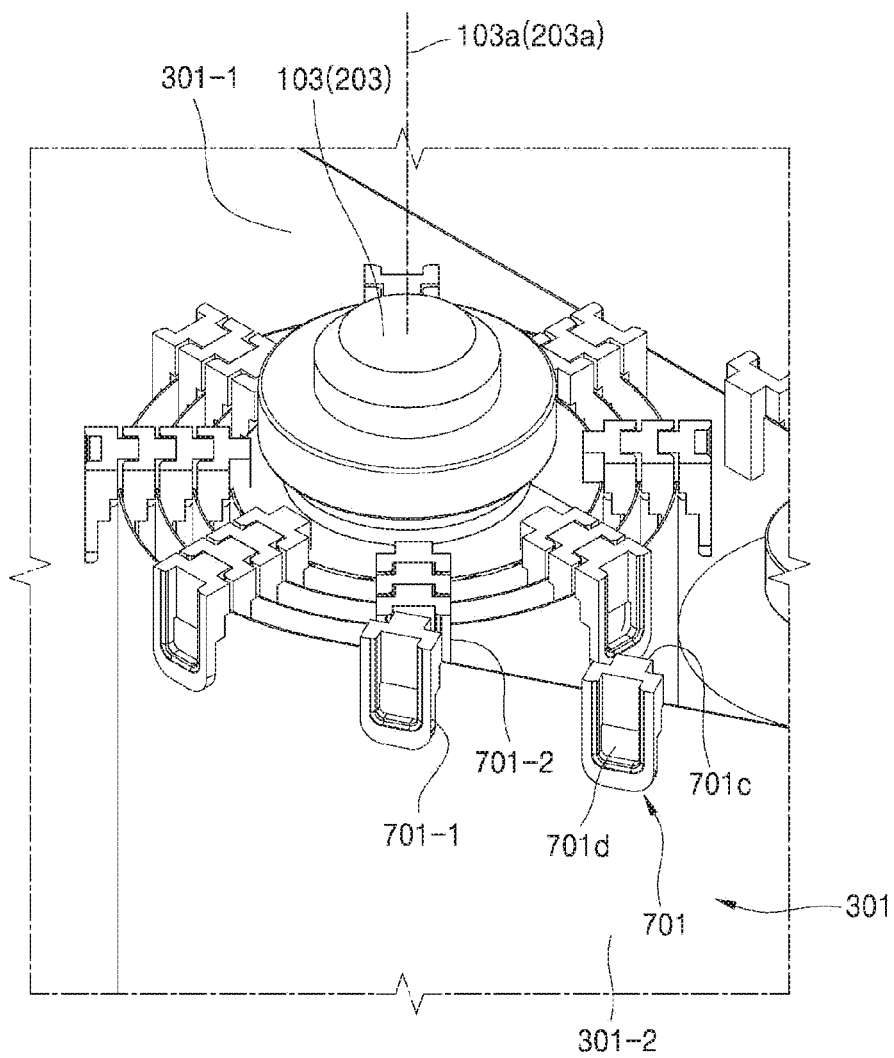
FIG. 23A is a perspective view illustrating a state in which a display is wound around a roller according to an embodiment of the present disclosure.

FIG. 19 is an exploded perspective view of a connection structure according to an embodiment of the present disclosure. FIG. 20 is a rear perspective view of the connection structure of FIG. 19. FIG. 21 is a cross-sectional view taken along a line C-C' of FIG. 20. FIGS. 22A and 22B are conceptual views illustrating a process in which a connection member and the support unit 6 are connected to each other. FIG. 23A is a perspective view illustrating a state in which the display 301 is wound around the rollers 103 and 203. Although FIGS. 19 to 23A illustrate the connection structure between the first support member 6-1 and the display 301, a connection structure between the second support member 6-2 and the display 301 is the same as the connection structure between the first support member 6-1 and the display 301. Accordingly, in FIGS. 19 to 23A, reference numerals for describing the connection structure between the second support member 6-2 and the display 301 are indicated in parentheses.

Referring to FIGS. 19 to 23A, a plurality of connection members 701 are coupled to the edges 301a and 301b of the display 301. The connection members 701 may be, for example, a clip type. A pitch of the connection members 701 arranged along the edges 301a and 301b of the display 301 may be constant or may not be constant. In an example, the pitch of the connection members 701 may be the same as the interval between the segmented links 601. In another example, the pitch of the connection members 701 may increase closer to the second body 401 and may decrease closer to the rollers 103 and 203. The length of the display 301 wound once around the rollers 103 and 203 when the display 301 is wound relatively many times around the rollers 103 and 203 is greater than the length of the display 301 wound once around the rollers 103 and 203 when the display 301 is wound relatively small times around the rollers 103 and 203. Considering the above, the pitch of the connection members 701 may be determined such that, when the display 301 is wound around the rollers 103 and 203, the connection members 701 may be aligned in a radial direction at a plurality of positions in a circumferential direction. In other words, when the display 301 is wound around the rollers 103 and 203, as illustrated in FIG. 23A, the connection members 701 are located on the same line in a radial direction at positions in the circumferential direction. According to the above structure, when the display 301 is wound around the rollers 103 and 203, the image display surface 301-1 and the rear surface 301-2 are spaced part from each other by a certain interval. Accordingly, when the display 301 is wound around the rollers 103 and 203 or unrolled outward from the rollers 103 and 203, a possibility of the image display surface 301-1 being damaged due to friction between the image display surface 301-1 and the rear surface 301-2 may be reduced.

Referring to FIG. 23A, the connection members 701 may include a protruding portion 701c and a concave portion 701d formed to be concave at the opposite side of the protruding portion 701c. When the connection members 701 are located on the same line in the radial direction at positions in the circumferential direction, the protruding portion 701c of a connection member 701-1 located outwardly in the radial direction may be inserted into the concave portion 701d of the connection member 701-2 located inwardly. Accordingly, the connection member 701-1 and the connection member 701-2 may be arranged in the radial direction without a deviation in the length direction A1 of the display 301. Accordingly, the connection members 701 may be stably aligned in the radial direction.

Referring to FIG. 21, each of the connection members 701 may include a fixing portion 701a to which the edge 301a or 301b of the display 301 is fixed, and a first connection portion 701b stepped from the fixing portion 701a. The first connection portion 701b is coupled to a second connection portion 601b provided at each of the segmented links 601 forming the first and second support members 6-1 and 6-2. For example, the first connection portion 701b has a protruding shape, whereas the second connection portion 601b has a shape of an insertion groove into which the first connection portion 701b is inserted, or vice versa. The insertion groove may have a shape of being cut in the length direction A1. Even when the pitch of the connection members 701 is not constant, the first connection portion 701b may be easily coupled to the second connection portion 601b. According to the above-described structure, as the first connection portion 701b is coupled to the second connection portion 601b, the display 301 may be stably supported without being separated from the first and second support members 6-1 and 6-2, thereby being flatly maintained.

FIG. 22A is a schematic plan view of FIG. 20, that is, a view 1001 showing the rollers 103 and 203 and the first and second support members 6-1 and 6-2 viewed in a direction along the rotation axes 103a and 203a of the rollers 103 and 203. FIG. 22B is a schematic rear view of FIG. 20, that is, a view 1003 showing the rollers 103 and 203 and the first and second support members 6-1 and 6-2 viewed in a direction along the rotation axes 195a, 196a, 295a, and 296a of the sprockets 195, 196, 295, and 296. Referring to FIGS. 20 to 22B, a process in which the connection members 701 and the segmented links 601 are coupled to each other until the display 301 is unrolled outward from the rollers 103 and 203.

As described above, the rotation axes 195a, 196a, 295a, and 296a of the sprockets 195, 196, 295, and 296 are perpendicular to the rotation axes 103a and 203a of the rollers 103 and 203. The first and second support members 6-1 and 6-2 are moved in the width direction A2 in the first bodies 101 and 201, and the movement directions of the first and second support members 6-1 and 6-2 are changed to the length direction A1 by the sprockets 195, 196, 295, and 296. Accordingly, the segmented links 601 having passed the sprockets 195, 196, 295, and 296 are moved in the length direction A1 parallel to the display 301. Conceptually, the rollers 103 and 203 and the sprockets 195, 196, 295, and 296 are connected with each other in the form of a bevel gear to connect the display 301 and the first and second support members 6-1 and 6-2 to each other.

In FIGS. 22A and 22B, when the first bodies 101 and 201 are moved away from the second body 401, the display 301 is unrolled outward from the rollers 103 and 203 and moved in the length direction A1. In this state, the first and second support members 6-1 and 6-2 are moved in the width direction A2, and then, the movement directions of the first and second support members 6-1 and 6-2 are changed to the length direction A1 by the sprockets 195, 196, 295, and 296. During the change of the movement direction, that is, the segmented links 601 are rotated by being connected to the sprockets 195, 196, 295, and 296, an interval between the segmented links 601 and the display 301 gradually decreases as indicated by arrows 1013, 1014, and 1015 illustrated the view 1001 of FIG. 22A. Likewise, an interval between the edges 301a and 301b of the display 301 and the segmented links 601 gradually decreases as indicated by arrows 1021, 1022, and 1023 illustrated the view 1003 of FIG. 22B. While the segmented links 601 connected to the first and second sprockets 195, 196, 295, and 296 approach the display 301 by changing the movement directions thereof, as illustrated in FIGS. 20 and 21, the first connection portion 701b of the connection members 701 is sequentially coupled to the second connection portion 601b of each of the segmented links 601, and the display 301 and the segmented links 601 are unrolled outward from the first bodies 101 and 201. According to the above-described structure, the display 301 may be stably supported without being separated from the first and second support members 6-1 and 6-2, and thus, the display 301 expanding outwardly from the first bodies 101 and 201 may be flatly maintained.

When the first bodies 101 and 201 approach the second body 401, the segmented links 601 connected to the sprockets 195, 196, 295, and 296 change the movement directions from the length direction A1 to the width direction A2. In the process, the segmented links 601 are gradually separated from the edges 301a and 301b of the display 301, and the first connection portion 701b is separated from the second connection portion 601b. The display 301 is accommodated in the first bodies 101 and 201 by being wound around the rollers 103 and 203. The first and second support members 6-1 and 6-2 are accommodated in the accommodation units 151, 152, 251, and 252.

In FIG. 23A, the protruding portion 701c having a regular parallelepiped shape and the concave portion 701d corresponding to the protruding portion 701c and having one open side in the width direction A2 are employed as a structure to align the connection members 701-1 and 701-2 respectively located outwardly and inwardly in the radial direction by preventing slippage of the connection members 701-1 and 701-2 in the length direction A1. However, the shapes of the protruding portion 701c and the concave portion 701d are not limited to the shape illustrated in FIG. 23A. FIGS. 23B to 23H illustrate various shapes of the protruding portion 701c and the concave portion 701d.

Figure 23B:
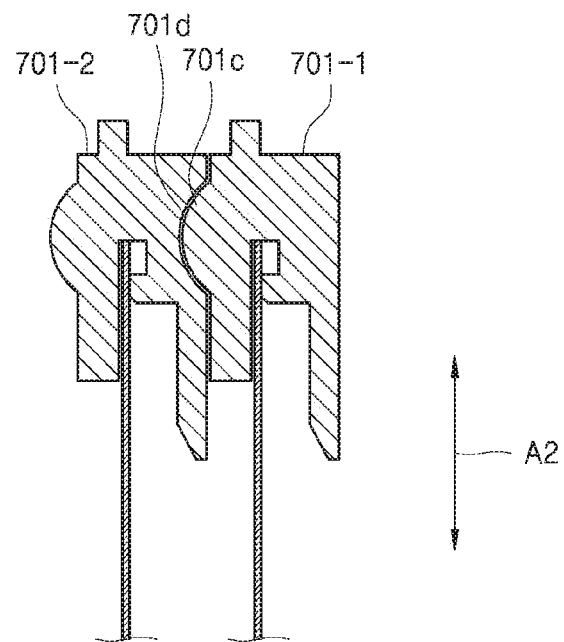
FIGS. 23B to 23H are schematic cross-sectional views illustrating examples of a protruding portion and a concave portion according to an embodiment of the present disclosure.
Figure 23C:
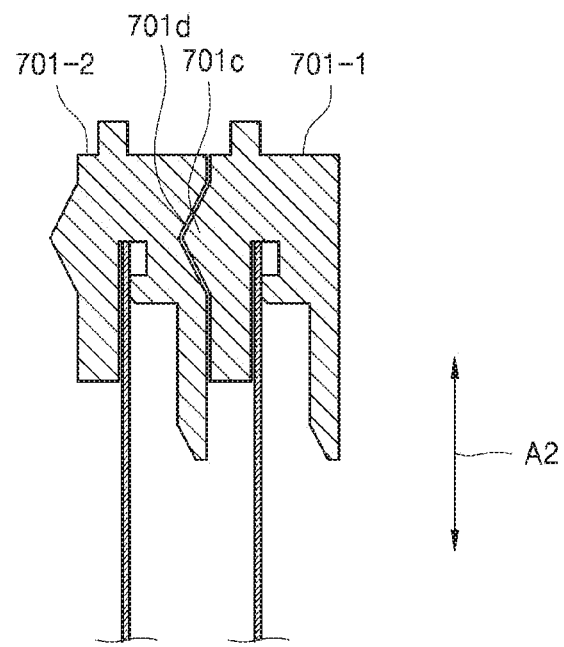
Figure 23D:
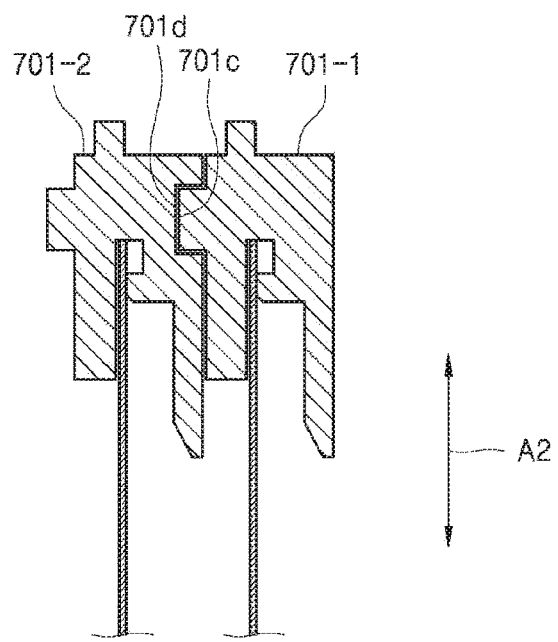
Figure 23E:
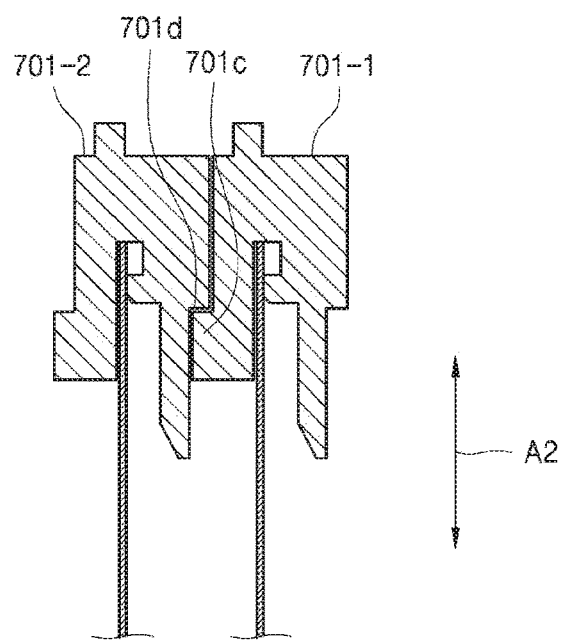
Figure 23F:
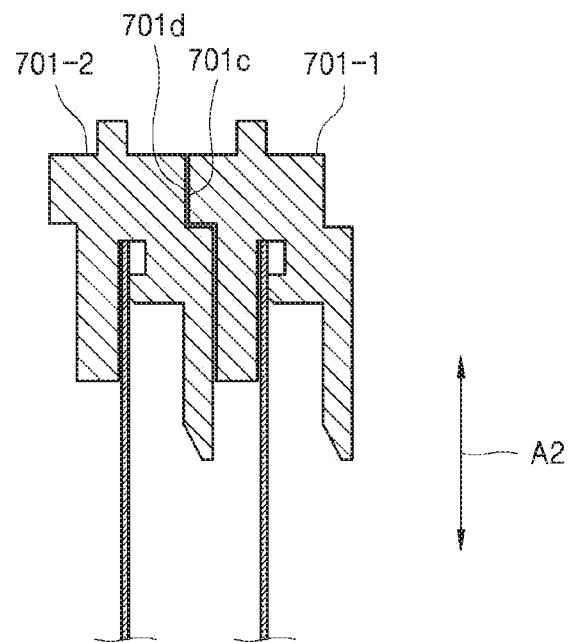
Figure 23G:
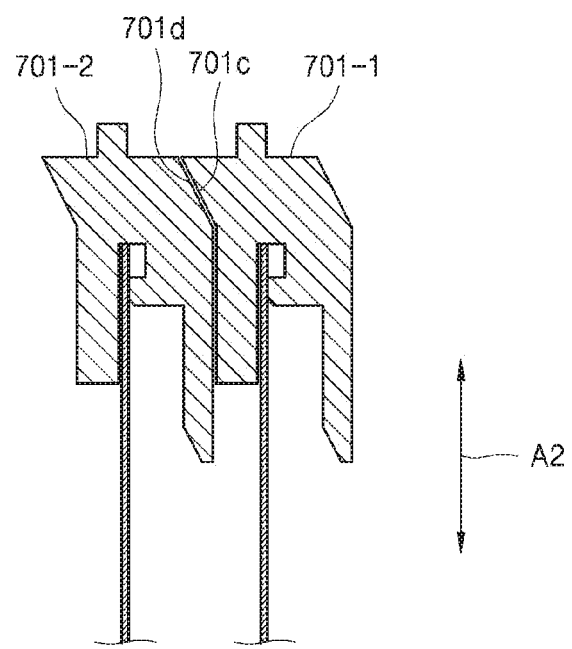
Figure 23H:
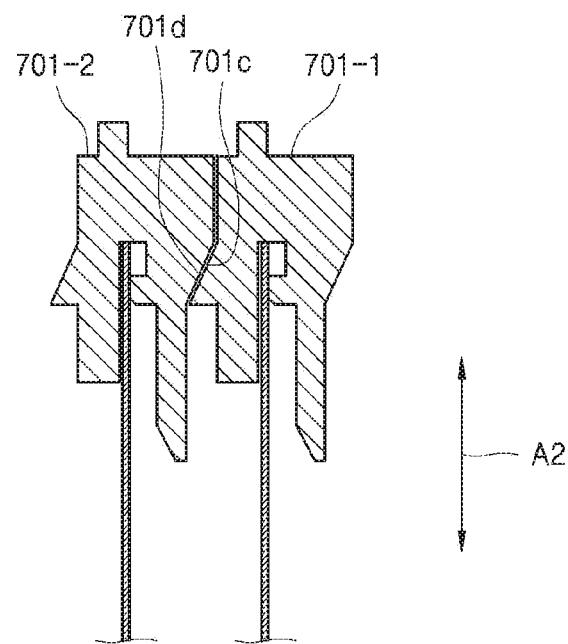

Referring to FIG. 23B, the protruding portion 701c and the concave portion 701d may respectively have a round convex shape and a round concave shape closed in the length direction A1 and the width direction A2. Referring to FIG. 23C, the protruding portion 701c and the concave portion 701d may respectively have an angled shape (a conic or pyramid shape) and a concave shape closed in the length direction A1 and the width direction A2. Referring to FIG. 23D, the protruding portion 701c has a rectangular parallelepiped shape and the concave portion 701d has a concave shape closed in the length direction A1 and the width direction A2. Referring to FIGS. 23E and 23F, the protruding portion 701c has a rectangular parallelepiped shape and the concave portion 701d has a concave shape closed in the length direction A1, but having one side open in the width direction A2. Referring to FIGS. 23G and 23H, the protruding portion 701c has an angled shape (a conic or pyramid shape) and the concave portion 701d has a concave shape closed in the length direction A1, but having one side open in the width direction A2.

Figure 23I:
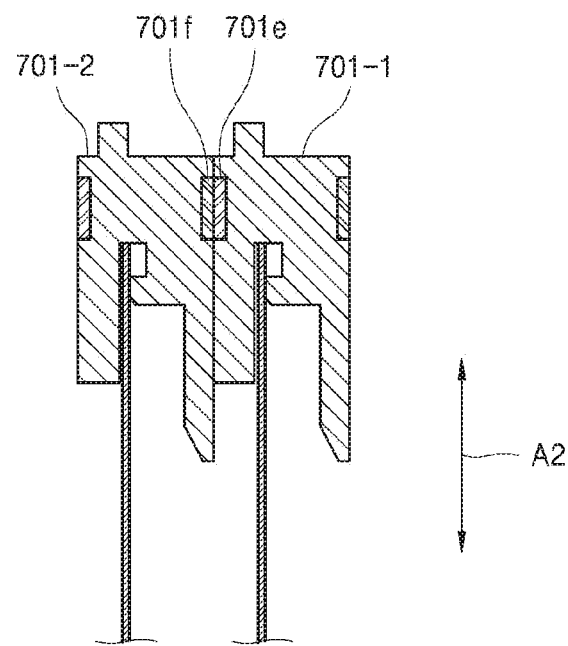
FIG. 23I is a schematic cross-sectional view of a slip prevention structure using a magnetic force according to an embodiment of the present disclosure.

A magnetic force may be used to align the connection members 701-1 and 701-2 in the radial direction by preventing slippage of the connection members 701-1 and 701-2 in the length direction A1. FIG. 23I is a cross-sectional view of a slip prevention structure using a magnetic force. Referring to FIG. 23I, the connection members 701 may include a first magnetic member 701e and a second magnetic member 701f located at the opposite side of the first magnetic member 701e. The first magnetic member 701e and the second magnetic member 701f have the opposite polarities. When the connection members 701 are located on the same line in the radial direction at positions in the circumferential direction, the first magnetic member 701e of the connection member 701-1 located outwardly in the radial direction is attracted by a magnetic force to the second magnetic member 701f of the connection member 701-2 located inwardly in the radial direction. Accordingly, the connection member 701-1 and the connection member 701-2 may be aligned in the radial direction without being deviated in the length direction A1 of the display 301. Accordingly, the connection members 701 may be stably aligned in the radial direction. The first magnetic member 701e and the second magnetic member 701f may respectively have a protruding shape and a concave shape as illustrated in FIGS. 23A to 23H.

Figure 23J:
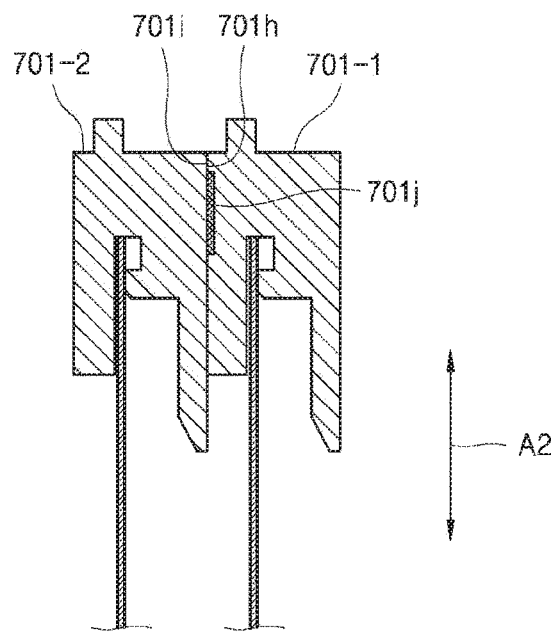
FIG. 23J is a schematic cross-sectional view of a slip prevention structure using a frictional force according to an embodiment of the present disclosure.

A frictional force may be used to align the connection members 701-1 and 701-2 in the radial direction by preventing slippage of the connection members 701-1 and 701-2 in the length direction A1. FIG. 23J is a cross-sectional view of a slip prevention structure using a frictional force. Referring to FIG. 23J, the connection members 701 may include a first facing portion 701h located at the side of the image display surface 301-1 and a second facing portion 701i located at the opposite side of the first facing portion 701h. At least one of the first and second facing portions 701h and 701i may include a frictional portion 701j having a reinforced frictional force. The frictional portion 701j may be embodied, for example, by attaching a frictional portion member manufactured of elastomer having a large frictional force to the connection members 701, coating the connection members 701 with a material having a large frictional force, or applying a certain surface roughness to the connection members 701. When the connection members 701 are located on the same line in the radial direction at positions in the circumferential direction, the first facing portion 701h of the connection member 701-1 located outwardly in the radial direction contacts the second facing portion 701i of the connection member 701-2 located inwardly in the radial direction. Since the frictional portion 701j is provided at least one of the first and second facing portions 701h and 701i, the connection member 701-1 and the connection member 701-2 may be aligned in the radial direction by the frictional force without being deviated in the length direction A1 of the display 301. Accordingly, the connection members 701 may be stably aligned in the radial direction.

Figure 23K:
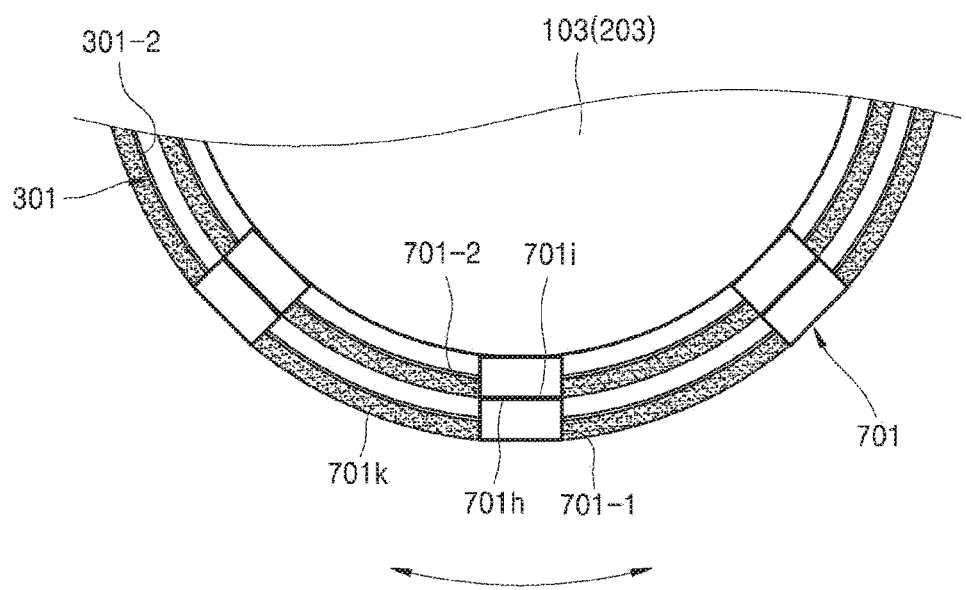
FIG. 23K is a schematic plan view of a slip prevention structure using a frictional force according to an embodiment of the present disclosure.

FIG. 23K is a schematic plan view of a slip prevention structure using a frictional force. Referring to FIG. 23K, a slip prevention portion 701k is provided between the connection members 701. The slip prevention portion 701k is provided on the rear surface 301-2 of the display 301. The slip prevention portion 701k may have a strap shape. The slip prevention portion 701k may be embodied by attaching a member having a strap shape manufactured of, for example, elastomer having a large frictional force, to the rear surface 301-2 of the display 301. The connection members 701 may include the first facing portion 701h located at the side of the image display surface 301-1 and the second facing portion 701i located at the opposite side of the image display surface 301-1. When the connection members 701 is located on the same line in the radial direction at positions in the circumferential direction, the first facing portion 701h of the connection member 701-1 located outwardly in the radial direction contacts the second facing portion 701i of the connection member 701-2 located inwardly in the radial direction. Even when the first facing portion 701h slips with respect to the second facing portion 701i to be deviated in the length direction A1, the first facing portion 701h contacts the slip prevention portion 701k and thus the first facing portion 701h does not slip in the length direction A1 and is maintained in a state of contacting the second facing portion 701i. Accordingly, the connection members 701 may be stably aligned in the radial direction. Although it is not illustrated, at least one of the first and second facing portions 701h and 701i may include the frictional portion 701j of FIG. 23J.

Figure 23L:
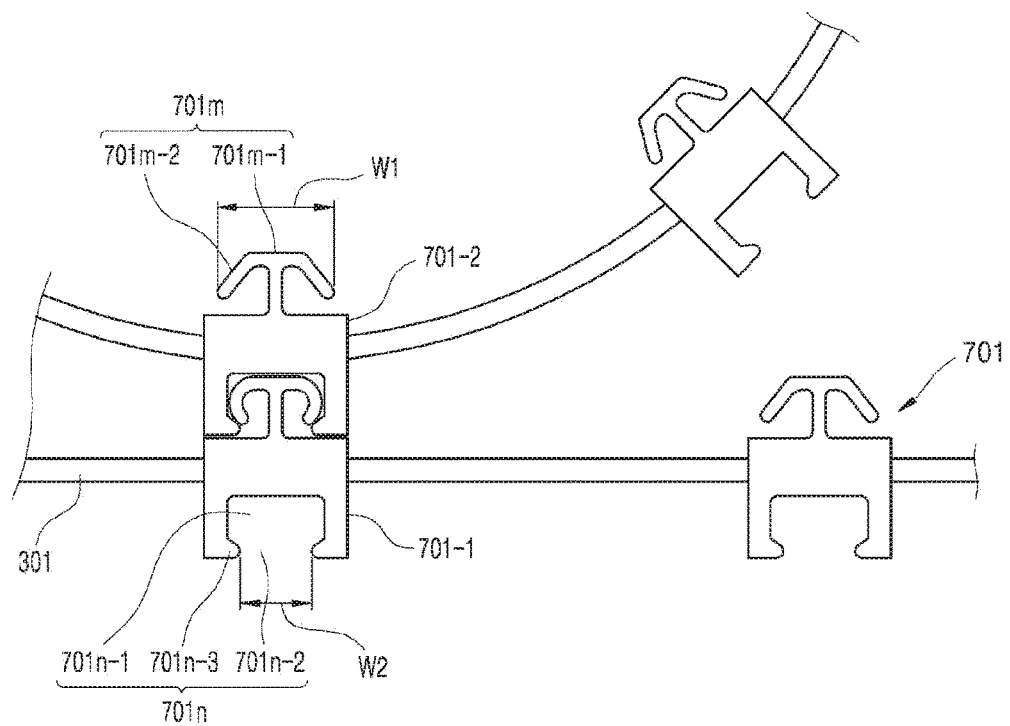
FIG. 23L is a schematic plan view of a slip prevention structure using a zipper-lock structure according to an embodiment of the present disclosure.

A zipper-lock structure may be used as a structure to align the connection members 701-1 and 701-2 in the radial direction by preventing slippage of the connection members 701-1 and 701-2 in the length direction A1. FIG. 23L is a schematic plan view of a slip prevention structure using a zipper-lock structure. Referring to FIG. 23L, the connection members 701 may include a protruding portion 701m and a concave portion 701n. The protruding portion 701m may include an extension portion 701m-1 extending in a thickness direction of the display 301, that is, in the radial direction of the rollers 103 and 203, and an elastic arm 701m-2 extending from the extension portion 701m-1 in the length direction A1 and elastically deformable in the length direction A1. The concave portion 701n may include an accommodation portion 701n-1 that is concave to accommodate the protruding portion 701m and a catch portion 701n-3 provided around an opening 701n-2 of the accommodation portion 701n-1 to catch the elastic arm 701m-2. A width W2 of the opening 701n-2 is smaller than a width W1 of the elastic arm 701m-2.

When the connection members 701 are located on the same line in the radial direction at positions in the circumferential direction, the protruding portion 701m of the connection member 701-1 located outwardly in the radial direction is coupled to the concave portion 701n of the connection member 701-2 located inwardly in the radial direction. In other words, as the display 301 is wound around the rollers 103 and 203, the connection member 701-1 approaches the connection member 701-2 and then the elastic arm 701*m*-2 is inserted into the accommodation portion 701*n*-1 through the opening 701*n*-2. Since the width W2 of the opening 701*n*-2 is smaller than the width W1 of the elastic arm 701*m*-2, the elastic arm 701*m*-2 is caught by the catch portion 701*n*-3 provided at an edge of the opening 701*n*-2. In this state, the connection member 701-1 is pushed by a tensile force applied to the display 301 toward the connection member 701-2, and thus, the elastic arm 701*m*-2 is deformed in a direction in which the width W1 decreases. At the moment when the width W1 of the elastic arm 701*m*-2 equals to the width W2 of the opening 701*n*-2, the elastic arm 701*m*-2 passes through the opening 701*n*-2 and is inserted into the accommodation portion 701*n*-1. Then, the elastic arm 701*m*-2 returns to the original state and is caught by the catch portion 701*n*-3. Accordingly, the protruding portion 701*m* is maintained in a state of being inserted into the concave portion 701*n* and thus the connection members 701 may be stably aligned in the radial direction.

When the display 301 is unrolled outward from the rollers 103 and 203, a force (separation force) is applied to the connection member 701-1 in a direction in which the connection member 701-1 is separated from the connection member 701-2. When the separation force is applied to the connection member 701-1 in a state in which the elastic arm 701*m*-2 is caught by the catch portion 701*n*-3, the elastic arm 701*m*-2 is deformed in a direction in which the width W1 decreases. At the moment when the width W1 of the elastic arm 701*m*-2 equals to the width W2 of the opening 701*n*-2, the elastic arm 701*m*-2 passes through the opening 701*n*-2 and is separated from the accommodation portion 701*n*-1. Accordingly, the protruding portion 701*m* is separated from the concave portion 701*n*, and thus, the display 301 is unrolled outward from the rollers 103 and 203, thereby outwardly expanding from the first bodies 101 and 201.

Figure 24:
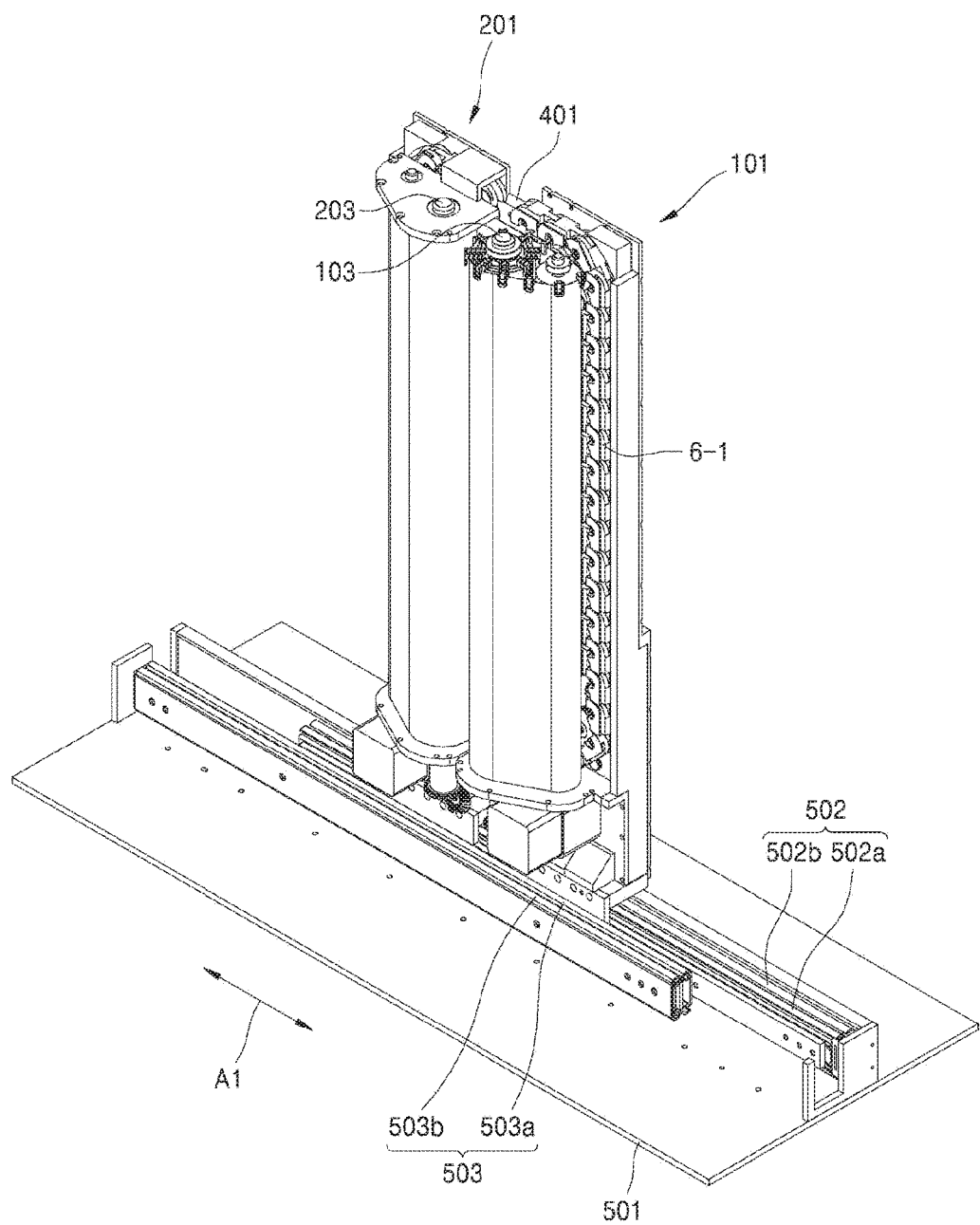
FIG. 24 is a perspective view of a rollable display device according to an embodiment of the present disclosure.

The first bodies 101 and 201 may be supported on the stand 501 to be slidable in the length direction A1. FIG. 24 is a perspective view of a rollable display device according to an embodiment of the present disclosure.

Referring to FIG. 24, the first bodies 101 and 201 are illustrated by omitting the housings forming an outer appearance thereof. The stand 501 is extended in the length direction A1. A pair of rails 502 and 503 are provided at the stand 501. The rails 502 and 503 extend in the length direction A1. The first bodies 101 and 201 are respectively connected to the rails 502 and 503. According to the above structure, the first bodies 101 and 201 may be supported on the stand 501 to be slidable in the length direction A1.

In an embodiment of the present disclosure, the rail 502 may include a pair of slide bars 502*a* and 502*b*. The slide bar 502*a* is supported on the slide bar 502*b* to be slidable in the length direction A1. The slide bar 502*b* is supported on the stand 501 to be slidable in the length direction A1. The first body 101 is connected to the slide bar 502*a*. According to the above-described structure, the slide bar 502*b* may slide with respect to the stand 501 within a range of the length of the stand 501, whereas the slide bar 502*a* may slide with respect to the slide bar 502*b* beyond the range of the length of the stand 501. Accordingly, while the length of the stand 501 in the length direction A1 is reduced, a sliding range of the first body 101 may be extended over the range of the length of the stand 501.

Likewise, the rail 503 may include a pair of slide bars 503*a* and 503*b*. The slide bar 503*a* is supported on the slide bar 503*b* to be slidable in the length direction A1. The slide bar 503*b* is supported on the stand 501 to be slidable in the length direction A1. The first body 201 is connected to the slide bar 503*a*. According to the above-described structure, while the length of the stand 501 in the length direction A1 is reduced, a sliding range of the first body 201 may be extended over the range of the length of the stand 501.

The display 301 may be unrolled outward from the first bodies 101 and 201 by only a necessary length. The expansion length of the display 301, that is, the length of the display 301 unrolled outward from the first bodies 101 and 201, may be adjusted in multiple steps. The expansion length may be adjusted by locking the first bodies 101 and 201 at a plurality of separation positions with respect to the second body 401. The rollable display device may include a locking unit for locking the first bodies 101 and 201 at a plurality of separation positions with respect to the second body 401.

Figure 25A:
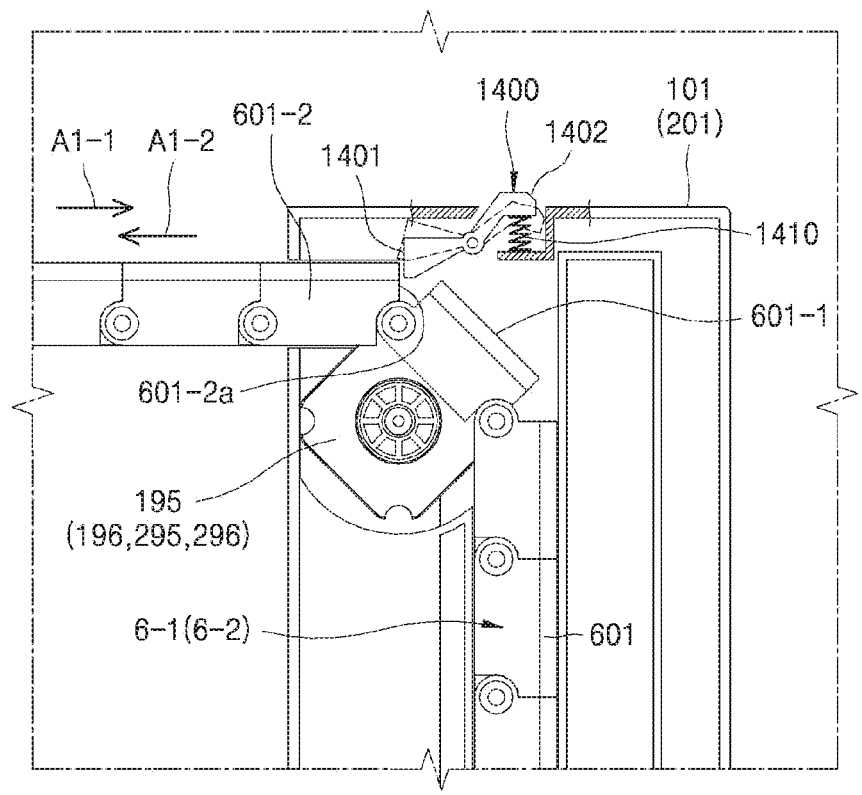
FIG. 25A is a front view of a locking unit according to an embodiment.

FIG. 25A is a front view of a locking unit according to an embodiment of the present disclosure.

Referring to FIG. 25A, the locking unit according to an embodiment of the present disclosure, may include a blocking member 1400 for locking the first bodies 101 and 201 at a plurality of separation positions. The blocking member 1400 according to the present disclosure selectively allows the first support member 6-1 to move in an accommodation direction A1-1 in which the first support member 6-1 is accommodated in the first bodies 101 and 201. The blocking member 1400 has a blocking position indicated by a solid line, where the first support member 6-1 is prevented from moving in the accommodation direction A1-1, and an unblocking position indicated by a dotted line, where the first support member 6-1 is allowed to move in the accommodation direction A1-1. For example, the blocking member 1400 may be supported on the first bodies 101 and 201 to be pivotable between the blocking position and the unblocking position. An elastic member 1410 applies an elastic force to the blocking member 1400 in a direction to be pivotable in the blocking position. The blocking member 1400 may include a blocking portion 1401 for blocking the first support member 6-1 in the accommodation direction A1-1, and an operation portion 1402 partially exposed outwardly from the first bodies 101 and 201 for a user to set the unblocking position. The blocking member 1400 is located adjacent to the sprocket 195. An interval is generated between a segmented link 601-1 that is connected to the sprocket 195 and has the transfer direction changed and a segmented link 601-2 located before the segmented link 601-1. As indicated by a solid line in FIG. 25A, the blocking member 1400 blocks movement of the first support member 6-1 in the accommodation direction A1-1 as the blocking portion 1401 catches a rear end portion 601-2*a* of the segmented link 601-2, that is, an end portion of the segmented link 601-2 in the accommodation direction A1-1.

When the first bodies 101 and 201 are separated from the second body 401, that is, the first support member 6-1 is moved in a direction A1-2 in which the first support member 6-1 is unrolled outward from the first bodies 101 and 201, the segmented link 601-1 pushes the blocking portion 1401 so that the blocking member 1400 is switched to the unblocking position. When interference between the segmented link 601-1 and the blocking portion 1401 ends, the blocking member 1400 is returned to the blocking position by an elastic force of the elastic member 1410. Then, the segmented link 601-1 reaches the location of the segmented link 601-2, the rear end portion 601-2*a* of the segmented link 601-2 is caught by the blocking portion 1401, the movement of the first support member 6-1 in the accommodation direction A1-1 is stopped. As the above process is repeated, the first bodies 101 and 201 are separated from the second body 401 and the display 301 is unrolled outward from the first bodies 101 and 201 to expand outwardly. In this state, in order for the first bodies 101 and 201 to move in a direction to approach the second body 401, the first support member 6-1 is moved in the accommodation direction A1-1. However, since the rear end portion 601-2a of the segmented link 601-2 is caught by the blocking portion 1401 of the blocking member 1400 located at the blocking position, the first support member 6-1 is prevented from moving in the accommodation direction A1-1. Accordingly, the first bodies 101 and 201 may not move in a direction to approach the second body 401, the expansion length of the display 301 may be maintained. When the display 301 is accommodated in the first bodies 101 and 201, the blocking member 1400 is switched to the unblocking position by pushing the operation portion 1402 and thus the first bodies 101 and 201 may approach the second body 401.

According to the above-described structure, the expansion length of the display 301 may be adjusted in units of lengths of the segmented links 601.

Although FIG. 25A illustrates a structure of selectively allowing the first support member 6-1 to move in the accommodation direction A1-1 by using the blocking member 1400, the blocking member 1400 may be employed to selectively allow the second support member 6-2 to move in the accommodation direction A1-1.

Figure 25B:
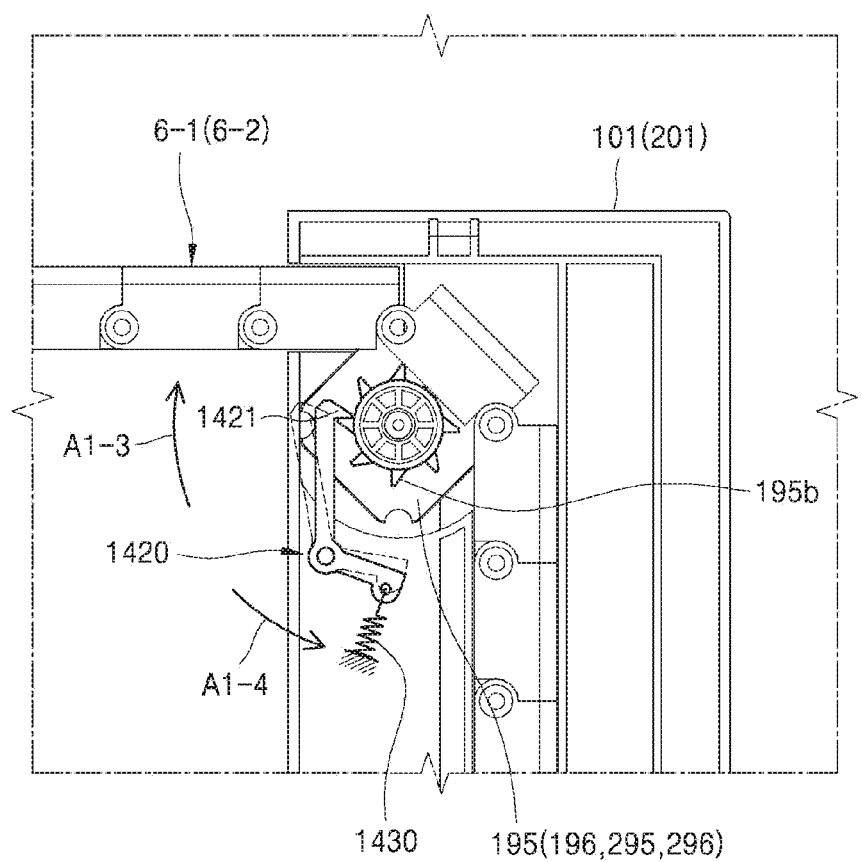
FIG. 25B is a front view of a locking unit according to an embodiment of the present disclosure.

FIG. 25B is a front view of a locking unit according to an embodiment of the present disclosure.

Referring to FIG. 25B, the locking unit according to the present embodiment of the present disclosure may include a blocking member 1420. The blocking member 1420 selectively allows the sprocket 195 to rotate in an accommodation direction A1-3 in which the first support member 6-1 is accommodated in the first bodies 101 and 201. A plurality of protruding steps 195b arranged in a circumferential direction are provided on the sprocket 195. The blocking member 1420 may have a blocking position indicated by a solid line, where the rotation of the sprocket 195 in the accommodation direction A1-3 is prevented as the blocking member 1420 is caught by the protruding steps 195b, and an unblocking position indicated by a dotted line, where the rotation of the sprocket 195 in the accommodation direction A1-3 is allowed. For example, the blocking member 1420 may be supported on the first bodies 101 and 201 to be pivotable between the blocking position and the unblocking position. An elastic member 1430 applies an elastic force to the blocking member 1420 in a direction to pivot to the blocking position. The blocking member 1420 may be partially exposed outwardly from the first bodies 101 and 201 so that a user may switch the blocking member 1420 to the unblocking position. Although it is not illustrated, the first bodies 101 and 201 may be provided with an operation portion that is connected to be the blocking member 1420 to switch the blocking member 1420 to the unblocking position.

When the first bodies 101 and 201 are separated from the second body 401, that is, the sprocket 195 is rotated in a direction A1-4 in which the first support member 6-1 is unrolled outward from the first bodies 101 and 201, the protruding steps 195b push a blocking portion 1421 so that the blocking member 1420 is switched to the unblocking position. When interference between the protruding step 195b and the blocking portion 1421 ends, the blocking member 1420 is returned to the blocking position by an elastic force of the elastic member 1430 and thus the rotation of the sprocket 195 in the accommodation direction A1-3 is stopped. As the above process is repeated, the first bodies 101 and 201 are separated from the second body 401 and the display 301 is unrolled outward from the first bodies 101 and 201 to expand outwardly. In this state, in order for the first bodies 101 and 201 to move in a direction to approach the second body 401, the sprocket 195 is rotated in the accommodation direction A1-3. However, since the sprocket 195 is caught by the blocking portion 1421 of the blocking member 1420 located at the blocking position, the sprocket 195 is prevented from rotating in the accommodation direction A1-3. Accordingly, the first bodies 101 and 201 may not move in a direction to approach the second body 401, the expansion length of the display 301 may be maintained. When the display 301 is accommodated in the first bodies 101 and 201, the blocking member 1420 is switched to the unblocking position by manipulating the operation portion and thus the first bodies 101 and 201 may approach the second body 401.

According to the above-described structure, the expansion length of the display 301 may be adjusted in units of arrangement interval of the protruding steps 195b.

Although FIG. 25B illustrates a structure of selectively allowing the sprocket 195 to rotate in the accommodation direction A1-3 by using the blocking member 1420, the blocking member 1420 may be used to allow the sprockets 196, 295, and 296 to rotate in the accommodation direction A1-3.

Figure 26:
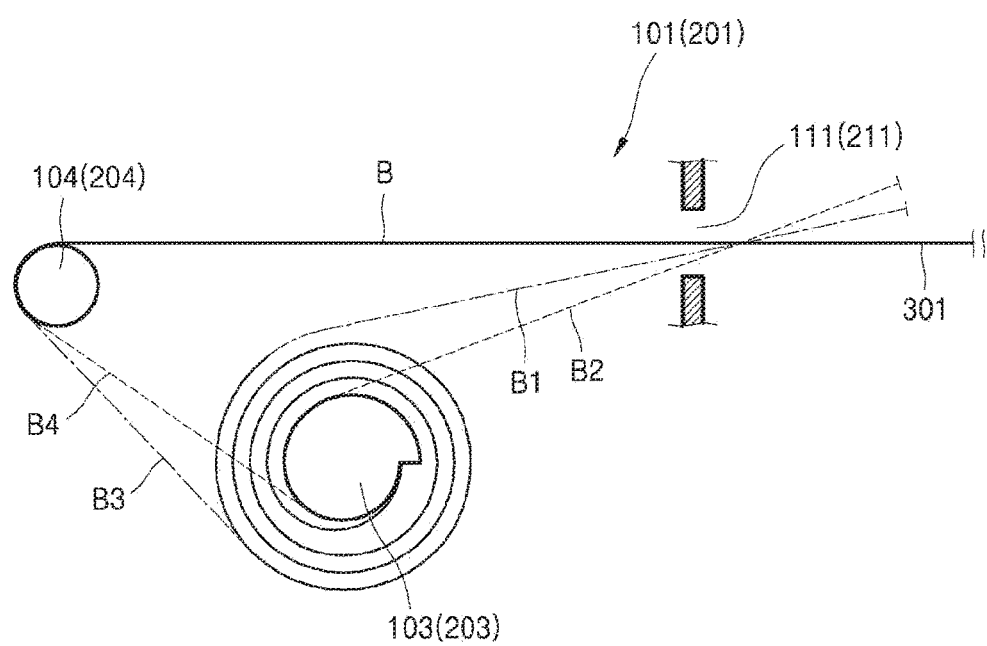
FIG. 26 is a schematic plan view of a rollable display device according to an embodiment of the present disclosure.

FIG. 26 is a schematic plan view of a rollable display device according to an embodiment of the present disclosure. In FIG. 26, the first body 101 is mainly illustrated.

Referring to FIG. 26, the first bodies 101 and 201 are provided with guide rollers 104 and 204, respectively. The guide rollers 104 and 204 guide the display 301 unrolled outward from the rollers 103 and 203 to the opening portions 111 and 211 provided in the first bodies 101 and 201. When the guide rollers 104 and 204 do not exist, if display 301 is most wound around the rollers 103 and 203, the display 301 proceeds toward the opening portions 111 and 211 along a path B1. If the display 301 is least wound around the rollers 103 and 203, the display 301 proceeds toward the opening portions 111 and 211 along a path B2. In other words, the proceeding direction of the display 301 unrolled through the opening portions 111 and 211 is changed according to a change in the amount of winding-up of the display 301 around the rollers 103 and 203. When the guide rollers 104 and 204 are provided, the proceeding direction of the display 301 between the rollers 103 and 203 and the guide rollers 104 and 204 is changed as indicated by paths B3 and B4 according to a change in the amount of winding-up of the display 301 around the rollers 103 and 203, the proceeding direction of the display 301 between the guide rollers 104 and 204 and the opening portions 111 and 211 is constant as indicated by a path B. Thus, the proceeding direction of the display 301 unrolled outward from the opening portions 111 and 211 may be maintained constant.

Figure 27:
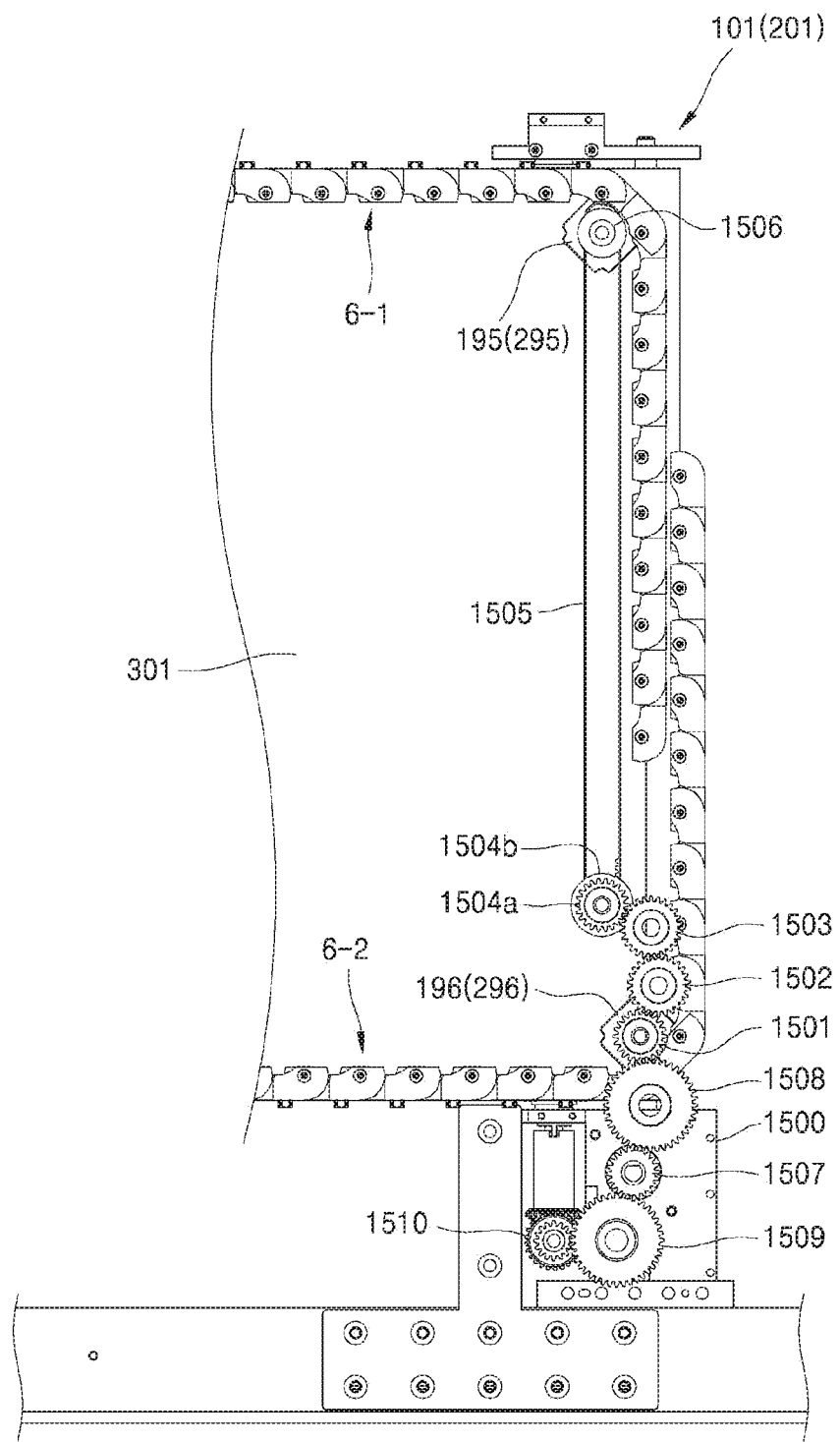
FIG. 27 is a rear view of a rollable display device according to an embodiment of the present disclosure.

The first and second support members 6-1 and 6-2 may be synchronously unrolled outward from/rolled back into the first bodies 101 and 201. FIG. 27 is a rear view of a rollable display device according to an embodiment of the present disclosure. In FIG. 27, the housings of the first bodies 101 and 201 are omitted.

Referring to FIG. 27, the first and second sprockets 195 and 196 may be connected to each other by a power connection device. The power connection device may include, for example, gears, belts, timing belts, wires, etc. An example of the power connection device is described with reference to FIG. 27. The second sprocket 196 is provided with a gear 1501. The second sprocket 196 is provided with a pulley 1506. A pulley 1504b forming a pair with the pulley 1506 is provided with a gear 1504*a*. The gear 1501 and the gear 1504*a* are connected to each other via gears 1502 and 1503. A belt, for example, a timing belt 1505, is wound around the pulley 1506 and the pulley 1504*b*. Accordingly, the first and second sprockets 195 and 196 may be synchronously rotated. Likewise, as illustrated by reference numerals in parentheses in FIG. 27, the first and second sprockets 295 and 296 provided in the second body 201 may be synchronously rotated by being connected by the power connection device in the same method. Accordingly, the first and second support members 6-1 and 6-2 may be synchronously unrolled outward from/rolled back into the first bodies 101 and 201.

Figure 28:
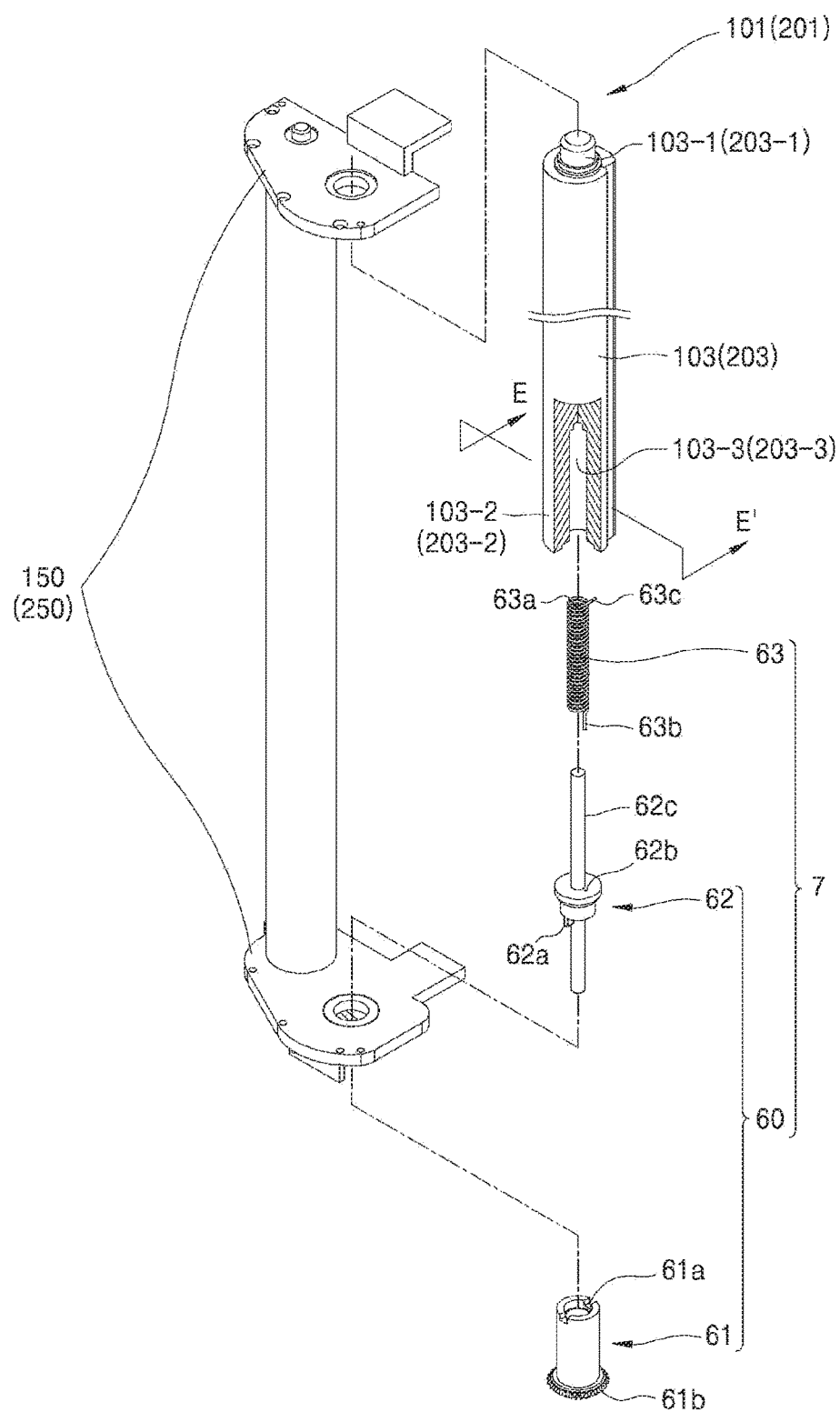
FIG. 28 is an exploded perspective view of a structure in which rollers are rotatably supported in first bodies, according to an embodiment of the present disclosure.
Figure 29:
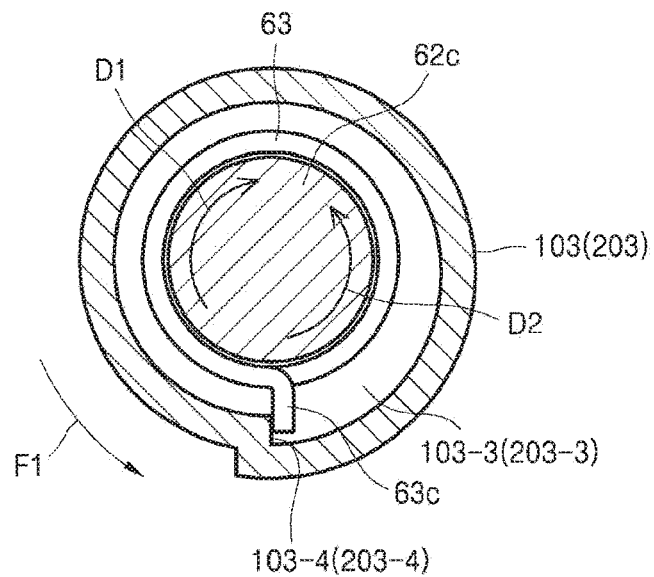
FIG. 29 is a cross-sectional view taken along a line E-E' of FIG. 28 according to an embodiment of the present disclosure.

As the first bodies 101 and 201 approach the second body 401, the rollers 103 and 203 wind up the display 301. To this end, the rollers 103 and 203 are rotated in a direction to wind up the display 301. In the following description, various embodiments of the present disclosure of a structure of rotating the rollers 103 and 203 are described. FIG. 28 is an exploded perspective view of a structure in which the rollers 103 and 203 are rotatably supported in the first bodies 101 and 201, according to an embodiment of the present disclosure. FIG. 29 is a cross-sectional view taken along a line E-E' of FIG. 28.

Referring to FIGS. 28 and 29, one end portions 103-1 and 203-1 of the rollers 103 and 203 may be rotatably supported on frames 150 and 250. The other ends portions 103-2 and 203-2 of the rollers 103 and 203 are rotatably supported on the frames 150 and 250 via the tensile force application portion 7.

The tensile force application portion 7 may be supported on the first bodies 101 and 201 to be rotatable in the same direction as the rollers 103 and 203 as the display 301 is unrolled outward from/rolled back into the first bodies 101 and 201. The tensile force application portion 7 may include a torsion spring 63 and a rotation support member 60, on which one end portion 63*b* of the torsion spring 63 is supported, the rotation support member 60 being rotatably supported on the frames 150 and 250. The rotation support member 60 may include a bushing member 61 rotatably supported on the frames 150 and 250 and a shaft member 62 having a support shaft 62*c* to rotatably support the other end portions 103-2 and 203-2 of the rollers 103 and 203. The bushing member 61 is rotatably supported on the frames 150 and 250. The shaft member 62 is rotated with the bushing member 61. To this end, the bushing member 61 and the shaft member 62 are provided with first and second coupling portions 61*a* and 62*a* having complementary shapes to be coupled to each other in a rotation direction. The support shaft 62*c* is inserted into an inner diameter portion 63*a* of the torsion spring 63. The one end portion 63*b* of the torsion spring 63 is fixed to the shaft member 62. For example, the one end portion 63*b* of the torsion spring 63 is inserted into a fixing hole 62*b* formed in the shaft member 62. The rollers 103 and 203 are provided with cavity portions 103-3 and 203-3. The torsion spring 63 is inserted into the cavity portions 103-3 and 203-3 in a state of being inserted around the support shaft 62*c*. Catch portions 103-4 and 203-4 for catching the other end portion 63*c* of the torsion spring 63 are provided in the cavity portions 103-3 and 203-3.

According to the above-described structure, the rollers 103 and 203 may be embodied in which the one end portions 103-1 and 203-1 rotatably are supported on the frames 150 and 250 and the other end portions 103-2 and 203-2 are rotatably supported on the frames 150 and 250 via the tensile force application portion 7. In this state, as illustrated in FIG. 29, an initial elastic force F1 in a direction to wind up the rollers 103 and 203 may be applied to the display 301 by rotating the rotation support member 60 in a direction D1. A tensile force in a direction in which the display 301 flatly expands may be applied to the display 301 by the initial elastic force F1.

In a state in which the initial elastic force F1 is active, when the rotation support member 60 is in a free state in which the rotation of the rotation support member 60 is not restricted, the rotation support member 60 is rotated by the initial elastic force F1 in a direction D2 that is opposite to the direction D1 and thus the initial elastic force F1 may be released. Thus, the rotation support member 60 needs to be locked so as not to be rotated in the state in which the initial elastic force F1 is applied to the display 301.

In the state in which the initial elastic force F1 is applied to the display 301, the rotation support member 60 is connected to at least one of the first and second support members 6-1 and 6-2. In other words, the rotation support member 60 is connected to at least one of the first and second support members 6-1 and 6-2 and locked in the state in which the initial elastic force F1 is applied to the display 301. When at least one of the first and second support members 6-1 and 6-2 moves, the rotation support member 60 is rotated accordingly. For example, the rotation support member 60 may be connected to the sprockets 195, 196, 295, and 296. Accordingly, when the sprockets 195, 196, 295, and 296 are not rotated, the rotation support member 60 is not rotated to be locked. When the sprockets 195, 196, 295, and 296 are rotated, the rotation support member 60 is rotated.

Figure 30:
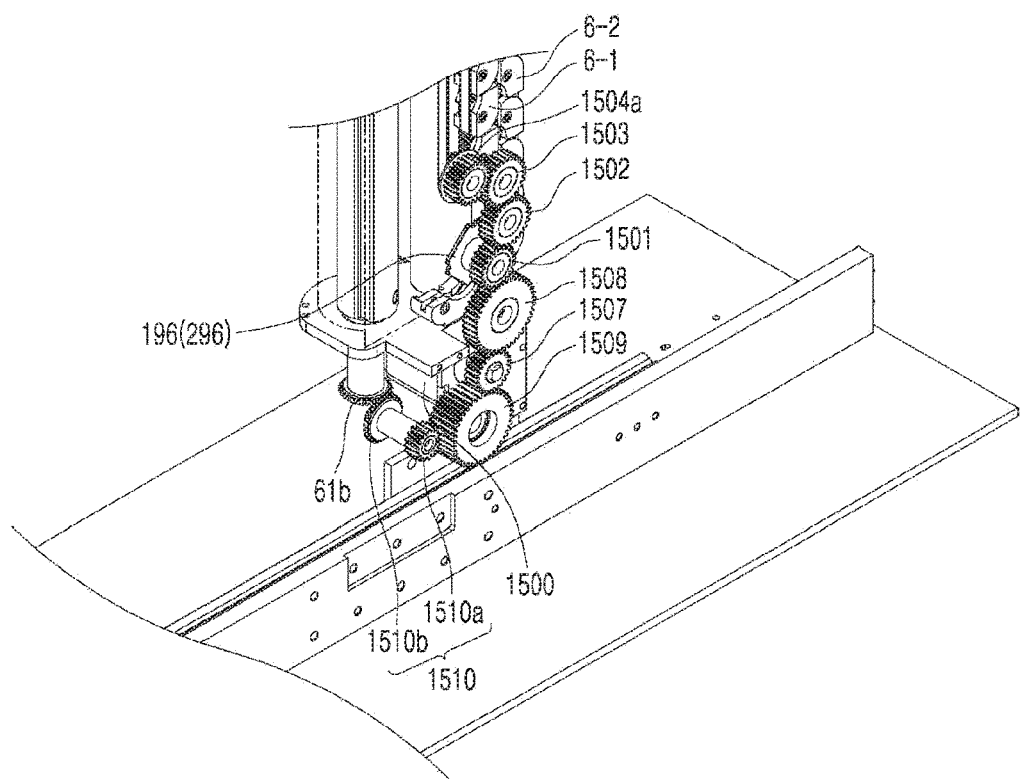
FIG. 30 is a perspective view of a connection structure of a rotation support member and a sprocket, according to an embodiment according to an embodiment of the present disclosure.

FIG. 30 is a perspective view of a connection structure of the rotation support member 60 and the sprockets 195, 196, 295, and 296, according to an embodiment of the present disclosure. Referring to FIGS. 27, 28, and 30, a gear portion 61*b* is provided on the rotation support member 60, for example, the bushing member 61. The gear portion 61*b* is connected to the sprockets 195, 196, 295, and 296. For example, the gear portion 61*b* is connected to the gear 1501 provided on the sprocket 196 (296) via gears 1507 to 1510. Since the rotation directions of the rollers 103 and 203 and the rotation support member 60 are perpendicular to the rotation direction the sprocket 196 (296), one of the gears 1507 to 1510 has a structure of capable of changing the rotation direction by 90°. For example, the gear 1510 may include a spur gear portion 1510*a* connected to the gear 1509 and a bevel gear portion 1510*b* coaxially rotated with the spur gear portion 1510*a*. The gear portion 61*b* is a bevel gear to be meshed with the bevel gear portion 1510*b*. According to the above-described structure, the rotation support member 60 is rotated interlocked with the rotation of the sprockets 195, 196, 295, and 296 according to the movements of the first and second support members 6-1 and 6-2.

As illustrated in FIG. 29, when the gear portion 61*b* is meshed with the bevel gear portion 1510*b* in a state in which the initial elastic force F1 in the direction to wind up the display 301 is applied to the rollers 103 and 203 by rotating the rotation support member 60 in the direction D1, the rotation support member 60 may be maintained in the state. In this state, when the first bodies 101 and 201 approach/are separated from the second body 401 and thus the display 301 is unrolled outward from/rolled back into the first bodies 101 and 201, the rollers 103 and 203 and the rotation support member 60 are rotated in a direction to unroll the display 301 or in a direction to wind up the display 301.

Figure 31:
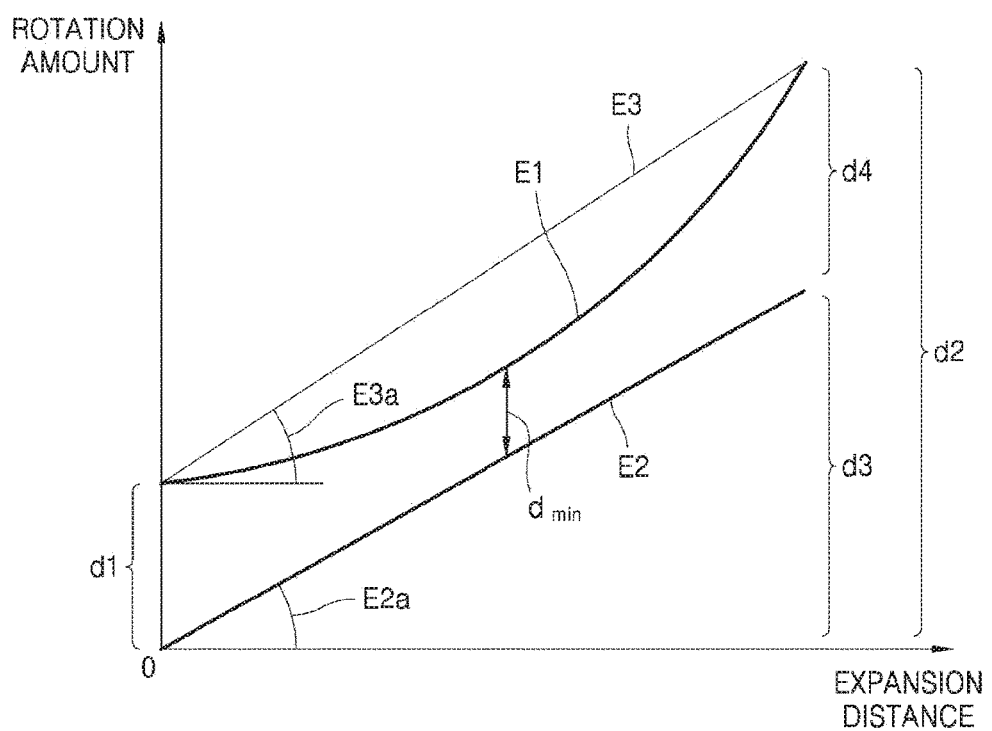
FIG. 31 is a graph of a relationship between an expansion distance of a display, a rotation amount of a roller, and a rotation amount of a rotation support member according to an embodiment of the present disclosure.

FIG. 31 is a graph of a relationship between an expansion distance of the display 301, a rotation amount of the rollers 103 and 203, and a rotation amount of the rotation support member 60. Referring to FIG. 31, when the expansion distance is "0", the initial rotation amount of the rollers 103 and 203 is "d1". The initial rotation amount "d1" does not signify a state in which the rollers 103 and 203 are actually rotated, but a relative rotation amount with respect to the rotation support member 60 to apply the initial elastic force F1.

The rotation amount of the rollers 103 and 203 has no linearly proportional relation with the expansion distance of the display 301. This is because the outer diameter of each of the rollers 103 and 203 including the display 301 is changed according to the amount of the display 301 wound around the rollers 103 and 203. In other words, when the amount of the display 301 wound around the rollers 103 and 203 is relatively small, the rotation amount of the rollers 103 and 203 with respect to a change in the same expansion distance is greater than a case in which the amount of the display 301 wound around the rollers 103 and 203 is relatively large. Accordingly, the relation between the expansion distance and the rotation amount of the rollers 103 and 203 has a curved shape in which an inclination gradually increases as the expansion distance increases as indicated by a curve E1 in FIG. 31.

If the rotation support member 60 is a structure that is not rotated, in a state in which the display 301 is fully unrolled outward from the first bodies 101 and 201, the rotation amount of the rollers 103 and 203 is "d2". The amount of the elastic force F2 provided by the torsion spring 63 to the rollers 103 and 203 is proportional to the rotation amount d2. Accordingly, in the state in which the display 301 is fully unrolled outward from the first bodies 101 and 201, the elastic force F2 that is very strong is applied to the rollers 103 and 203. Accordingly, as the expansion distance of the display 301 increases, a great force is needed to separate the first bodies 101 and 201 from the second body 401.

According to an embodiment of the present disclosure, as the display 301 is unrolled outward from/rolled back into the first bodies 101 and 201, the rotation support member 60 is rotated with the rollers 103 and 203. Since the expansion distance of the display 301 with respect to the first bodies 101 and 201 is the same as the movement amount of the first and second support members 6-1 and 6-2, a rotation amount d3 of the rotation support member 60 has a linearly proportional relation with the expansion distance of the display 301 with respect to the first bodies 101 and 201. Accordingly, the relation between the expansion distance and the rotation amount of the rotation support member 60 has a linear shape having an inclination E2a as indicated by a straight line E2 in FIG. 31.

An amount of an elastic force applied by the torsion spring 63 to the rollers 103 and 203 is proportional to a difference between the rotation amount of the rollers 103 and 203 and the rotation amount of the rotation support member 60. In other words, the amount of an elastic force applied by the torsion spring 63 to the rollers 103 and 203 when the display 301 is fully unrolled outward from the first bodies 101 and 201 is proportional to a rotation amount d4. Accordingly, according to the present embodiment of the present disclosure in which the rotation support member 60 is rotated with the rollers 103 and 203, an elastic force F2' when the display 301 is fully unrolled outward from the first bodies 101 and 201 is smaller than an elastic force F2 in the structure in which the rotation support member 60 is not rotated. Accordingly, a change in the amount of the elastic force applied to the rollers 103 and 203 in the expansion process of the display 301, that is, a change in the amount of the tensile force applied to the display 301, may be reduced and thus a change in the force consumed in the expansion process of the display 301 may be reduced.

The inclination E2a of a straight line E2 may be adjusted by a connection ratio of the gear portion 61b and the sprocket 196. For example, the inclination E2a of the straight line E2 may be adjusted by making one or more of the gears 1507 to 1510 a reduction gear. By appropriately setting a gear ratio of the reduction gear, a minimum value $d_{min}$ of a difference between the rotation amount of the rollers 103 and 203 and the rotation amount of the rotation support member 60 is equal to or greater than a value for flatly maintaining the display 301 and generating a minimum elastic force needed to rotate the rollers 103 and 203 as necessary according to the expansion distance when the display 301 is to be unrolled or wound. The inclination E2a of the straight line E2 may be set to be identical to an inclination E3a of a straight line E3 connecting the initial rotation amount and a final rotation amount of the rollers 103 and 203. Accordingly, a change amount of the elastic force applied by the torsion spring 63 to the rollers 103 and 203 according to the expansion distance of the display 301 may be reduced.

Although a structure of unrolling/rolling the display 301 outward from/back into the first bodies 101 and 201 by manually approaching/separating the first bodies 101 and 201 from the second body 401 is described in the above-described embodiments of the present disclosure, a structure of unrolling/rolling the display 301 outward from/back into the first bodies 101 and 201 by allowing the first bodies 101 and 201 to approach/be separated from the second body 401 by using a motor is possible. In an example, a motor rotates the first and second sprockets 195, 196, 295, and 296 to move the first and second support members 6-1 and 6-2 so that the first bodies 101 and 201 approach/is separated from the second body 401, thereby unrolling/rolling the display 301 outward from/back into the first bodies 101 and 201. Referring to FIGS. 27 and 30, the rollable display device may include a motor 1500. The motor 1500 rotates the gear 1507. The gear 1507 is connected to the gear 1501 provided in the sprocket 196. According to the above-described structure, when the first and second sprockets 195, 196, 295, and 296 are rotated in an unrolling direction by driving the motor 1500 in a forward direction, the first and second support members 6-1 and 6-2 expand outwardly from the first bodies 101 and 201. Then, as the first bodies 101 and 201 are spaced away from the second body 401, the display 301 is unrolled outward from the first bodies 101 and 201 to expand between the first bodies 101 and 201.

In contrast, when the first and second sprockets 195, 196, 295, and 296 are rotated in the accommodation direction by driving the motor 1500 in the reverse direction, the first and second support members 6-1 and 6-2 are rolled back into the first bodies 101 and 201. Then, the first bodies 101 and 201 approach the second body 401 and the display 301 may be accommodated in the first bodies 101 and 201.

In this process, the rotation support member 60 may be rotated in proportion to the expansion distance of the display 301.

Figure 32:
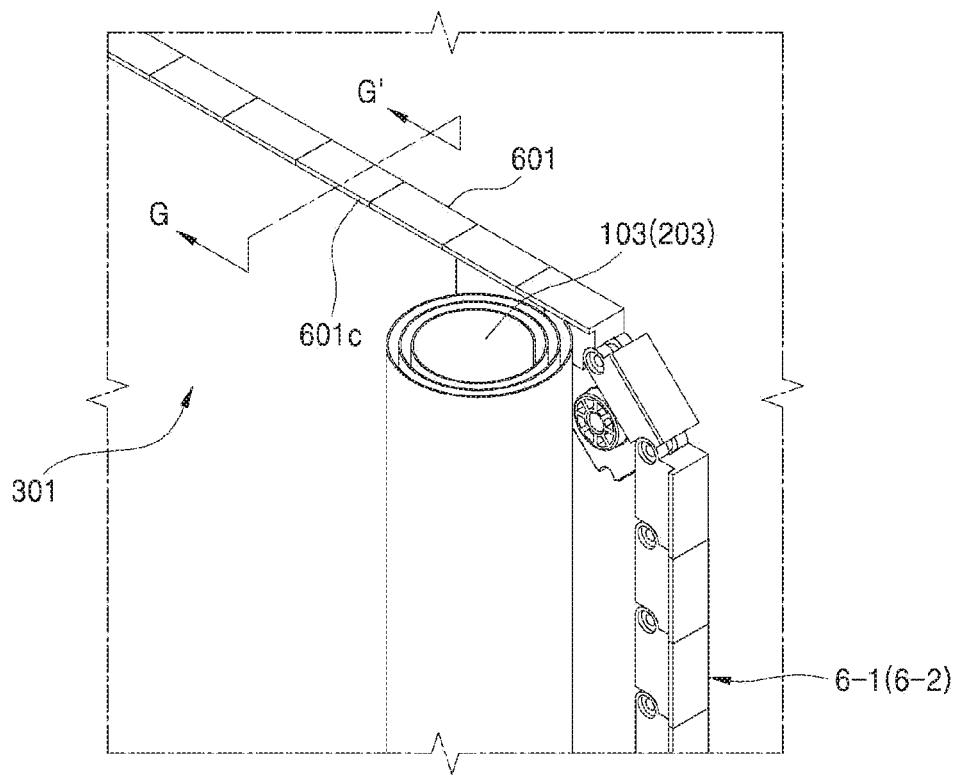
FIG. 32 is a partial perspective view of a rollable display device according to an embodiment according to an embodiment of the present disclosure.
Figure 33:
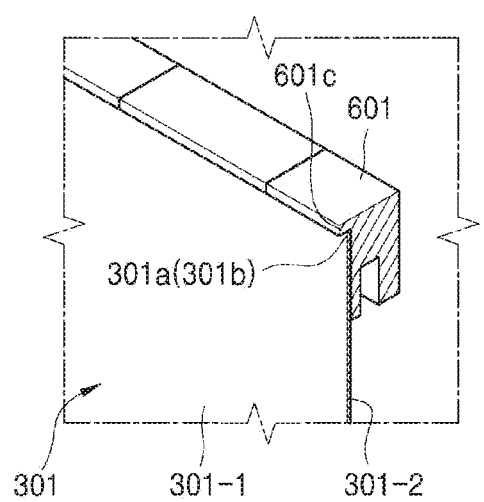
FIG. 33 is a cross-sectional view taken along a line G-G' of FIG. 32 according to an embodiment of the present disclosure.

FIG. 32 is a partial perspective view of a rollable display device according to an embodiment of the present disclosure. FIG. 33 is a cross-sectional view taken along a line G-G' of FIG. 32.

Referring to FIGS. 32 and 33, the segmented links 601 have a shape capable of protecting the edges 301a and 301b of the display 301. Each of the segmented links 601 include a rib 601c extending from the rear surface 301-2 of the display 301 to the image display surface 301-1 over the edges 301a and 301b. The rib 601c covers the edges 301a and 301b of the display 301. In a state in which the display 301 expands, the edges 301a and 301b may be damaged by an external shock. According to an embodiment of the present disclosure, the edges 301a and 301b are covered by the rib 601c. Accordingly, a possibility of damage to the edges 301a and 301b of the display 301 may be reduced.

Figure 34:
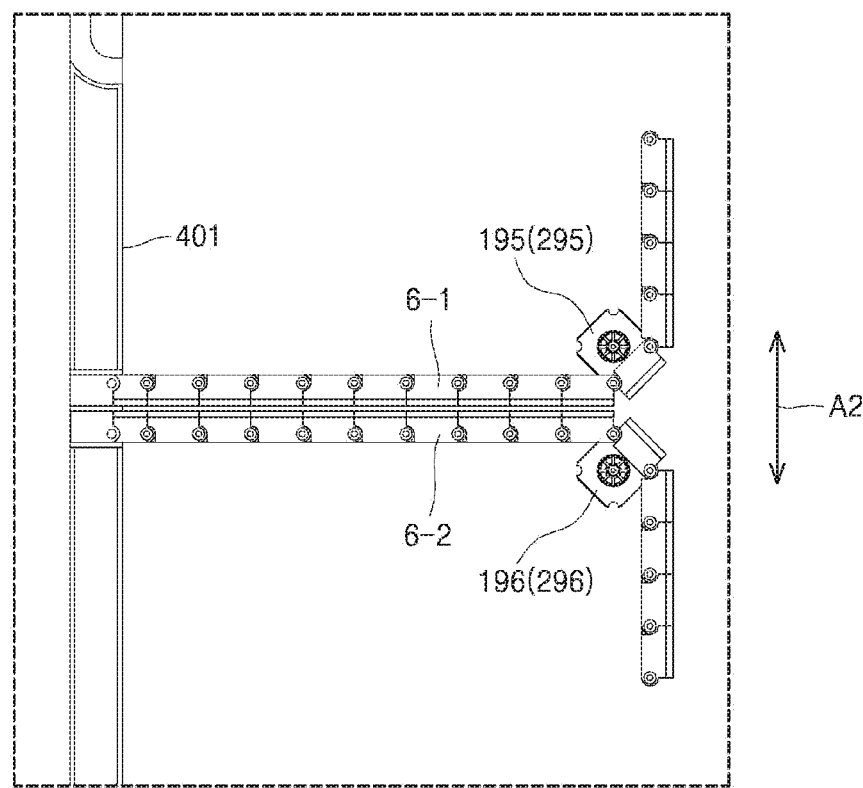
FIG. 34 is a schematic plan view of a rollable display device according to an embodiment of the present disclosure.

FIG. 34 is a schematic plan view of a rollable display device according to an embodiment of the present disclosure.

Referring to FIG. 34, the first and second support members 6-1 and 6-2 support a center portion of the display 301 in the width direction A2. In FIG. 34, the first and second support members 6-1 and 6-2 may be located adjacent to each other in the width direction A2 or arranged separated a certain distance from each other. The pivot directions of the segmented links 601 of the first and second support members 6-1 and 6-2 are opposite to each other. According to the above-described structure, in the state in which the first and second support members 6-1 and 6-2 are unrolled outward from the first bodies 101 and 201 to the outside, since the pivot in the opposite direction with respect to the hinge shaft 653 is restricted by the first and second support members 6-1 and 6-2, the display 301 may be stably maintained in an expanded state. The structure in which the first and second support members 6-1 and 6-2 are unrolled outward from/rolled back into the first bodies 101 and 201, the structure in which the display 301 is unrolled outward from/rolled back into the first bodies 101 and 201, and the structure of rotating the rollers 103 and 203 are the same as those described above.

Figure 35:
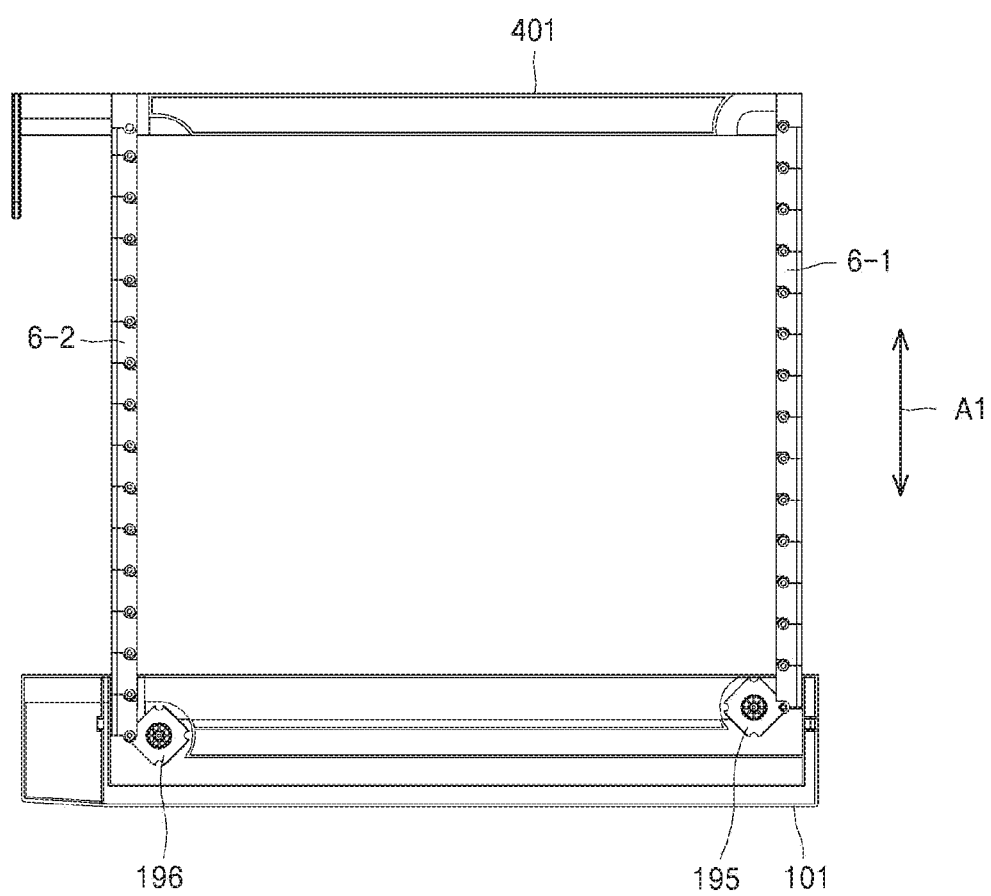
FIG. 35 is a schematic plan view of a rollable display device according to an embodiment of the present disclosure.

In the above-described embodiment, although the structure in which a pair of the first bodies 101 and 201 approach/is separated from the second body 401 is described, a structure in which one first body 101 may approach/be separated from the second body 401 is possible. FIG. 35 is a schematic plan view of a rollable display device according to an embodiment of the present disclosure. In FIG. 35, only a support structure is illustrated and the roller 103 is omitted. The rollable display device according to an embodiment of the present disclosure may be a hang-type apparatus in which the second body 401 is fixed on, for example, a wall or ceiling. The structure in which the first and second support members 6-1 and 6-2 are unrolled outward from/rolled back into the first body 101, the structure in which the display 301 is unrolled outward from/rolled back into the first body 101, and the structure of rotating the roller 103 are the same as those described above. One end portion of the display 301 is fixed to the roller 103, whereas the other end portion is fixed to the second body 401. One end portions of the first and second support members 6-1 and 6-2 are fixed to the second body 401.

It should be understood that various embodiments described herein should be considered in a descriptive sense only and not for purposes of limitation. Descriptions of features or aspects within each embodiment should typically be considered as available for other similar features or aspects in other various embodiments of the present disclosure.

In particular, although the display expands as the first bodies are moved in the latitudinal direction in the rollable display devices according to the above-described various embodiments of the present disclosure, the display may expand as the first bodies are moved in the longitudinal direction.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A rollable display device comprising:
   first and second bodies;
   a roller disposed in the first body to rotate around a first rotation axis;
   a display having an image display surface and a rear surface;
   a roller connected to one end portion of the display, and disposed in the first body to rotate around a first axis to wound up the display around the roller to accommodate the display in the first body when the first body comes close to the second body and to unwound the display from the roller to be spread between the first body and second body when first body is apart from the second body; and
   a support member having a plurality of segmented links connected to pivot around a hinge shaft between a rolled state where the support member is accommodated in the first body when the first body is close to the second body and an expanded state where at least one segmented link of the support member moves outward from the first body to support the rear surface of the display when first body is apart from the second body,
   wherein each of the plurality of segmented links includes a stopper to restrict the plurality of segmented links from pivoting over the expanded state.

2. The rollable display device of claim 1, further comprising a sprocket provided in the first body that is rotatable around a second rotation axis perpendicular to the image display surface and that moves the support member,
   wherein the sprocket changes a movement direction of the support member from a width direction to a length direction of the display when the support member is unrolled outward from the first body, and from the length direction to the width direction of the display when the support member is rolled back into the first body.

3. The rollable display device of claim 2, wherein the support member supports an edge in the width direction of the display.

4. The rollable display device of claim 3, wherein a rib extending to the image display surface over the edge is provided in each of the plurality of segmented links.

5. The rollable display device of claim 3,
   wherein the sprocket is disposed adjacent to the edge of the display,
   wherein a plurality of connection members having a first connection portion is provided at the edge of the display,
   wherein a second connection portion connected to the first connection portion is provided at the plurality of segmented links, and
   wherein the first connection portion and the second connection portion are connected to each other or disconnected from each other by the sprocket when a movement direction of the plurality of segmented links is changed between the length direction and the width direction.

6. The rollable display device of claim 5,
   wherein the first connection portion has a shape of a protrusion extending in the width direction of the display, and wherein the second connection portion has a shape of a groove into which the first connection portion is inserted.

7. The rollable display device of claim 5, wherein intervals between the plurality of connection members are intervals at which the plurality of connection members are aligned in a radial direction of the roller at a plurality of positions along a circumferential direction of the roller when the display is wound around the roller.

8. The rollable display device of claim 7, wherein the plurality of connection member has a structure to align the connection members respectively located outwardly and inwardly in the radial direction at one of the plurality of positions by preventing slippage of the connection members in the length direction.

9. The rollable display device of claim 2,
wherein the support member comprises first and second support members supporting opposite edges in the width direction of the display, and
wherein pivot directions of the plurality of segmented links of the first and second support members are opposite to each other.

10. The rollable display device of claim 2,
wherein the support member comprises first and second support members supporting the rear surface of the display at positions separated from each other in the width direction of the display, and
wherein pivot directions of the plurality of segmented links of the first and second support members are opposite to each other.

11. The rollable display device of claim 2, further comprising a locking unit locking the first body at a plurality of separation positions with respect to the second body.

12. The rollable display device of claim 11, wherein the locking unit comprises a blocking member having a blocking position and an unblocking position whereby a movement of the support member in an accommodation direction to be accommodated in the first body is prevented at the blocking position and allowed at the unblocking position.

13. The rollable display device of claim 12, wherein, at the blocking position, the blocking member prevents a segmented link, which is disposed before a segmented link that is engaged with the sprocket, from moving in the accommodation direction.

14. The rollable display device of claim 13, wherein, when the support member is unrolled outward from the first body, the blocking member interferes with the segmented link to be switched from the blocking position to the unblocking position.

15. The rollable display device of claim 14, wherein the locking unit further comprises an elastic member that applies an elastic force to the blocking member in such a direction that the blocking member is switched to the blocking position.

16. The rollable display device of claim 12,
wherein the locking unit further comprises a plurality of protruding steps provided at the sprocket, and
wherein the blocking member prevents the sprocket from rotating in a direction in which the support member is moved in the accommodation direction, by being caught by one of the protruding steps at the blocking position.

17. The rollable display device of claim 16, wherein, when the sprocket rotates in a direction in which the support member is unrolled outward from the first body, the blocking member interferes with the protruding steps to be switched to the unblocking position.

18. The rollable display device of claim 17, wherein the locking unit further comprises an elastic member to apply to the blocking member an elastic force in such a direction that the blocking member is switched to the blocking position.

19. The rollable display device of claim 1,
wherein another end portion of the display is connected to the second body, and
wherein one end portion of the support member is connected to the second body.

20. The rollable display device of claim 1,
wherein the first body comprises a pair of first bodies disposed at opposite sides with respect to the second body,
wherein the roller is provided at each of the pair of first bodies, wherein the one end portion and the other end portion of the display are connected to the pair of rollers, respectively, and
wherein the support member is provided across the pair of first bodies and a part of the support member is connected to the second body.

* * * * *